(12) United States Patent
Brown et al.

(10) Patent No.: US 9,160,693 B2
(45) Date of Patent: Oct. 13, 2015

(54) METHOD, APPARATUS AND SYSTEM FOR ACCESSING APPLICATIONS AND CONTENT ACROSS A PLURALITY OF COMPUTERS

(75) Inventors: Michael Stephen Brown, Kitchener (CA); Herbert Anthony Little, Waterloo (CA); Christopher Lyle Bender, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 116 days.

(21) Appl. No.: 13/205,266

(22) Filed: Aug. 8, 2011

(65) Prior Publication Data

US 2012/0079007 A1 Mar. 29, 2012

Related U.S. Application Data

(60) Provisional application No. 61/386,635, filed on Sep. 27, 2010.

(51) Int. Cl.
| | |
|---|---|
| *G06F 15/16* | (2006.01) |
| *H04L 12/58* | (2006.01) |
| *H04W 12/02* | (2009.01) |
| *H04L 29/08* | (2006.01) |
| *H04L 29/06* | (2006.01) |
| *H04W 4/12* | (2009.01) |

(52) U.S. Cl.
CPC ............... *H04L 51/08* (2013.01); *H04W 12/02* (2013.01); *H04L 51/38* (2013.01); *H04L 63/0272* (2013.01); *H04L 67/02* (2013.01); *H04L 67/28* (2013.01); *H04W 4/12* (2013.01)

(58) Field of Classification Search
None
See application file for complete search history.

(56) References Cited

U.S. PATENT DOCUMENTS

| | | | | |
|---|---|---|---|---|
| 6,553,410 | B2 * | 4/2003 | Kikinis | ......................... 709/218 |
| 6,587,928 | B1 | 7/2003 | Periyannan et al. | |
| 6,766,373 | B1 | 7/2004 | Beadle et al. | |
| 7,277,912 | B2 * | 10/2007 | Corboy et al. | ................ 709/203 |

(Continued)

FOREIGN PATENT DOCUMENTS

| | | |
|---|---|---|
| EP | 1791315 | 5/2007 |
| WO | 2005117392 | 12/2005 |

(Continued)

OTHER PUBLICATIONS

International Searching Authority, Written Opinion and International Search Report issued in PCT/CA2011/050547, mailed on Oct. 18, 2011, 10 pages.

(Continued)

*Primary Examiner* — Jason K. Gee
*Assistant Examiner* — Olanrewaju Bucknor
(74) *Attorney, Agent, or Firm* — Fish & Richardson P.C.

(57) ABSTRACT

A method, apparatus and system for accessing applications and content across a plurality of computers is provided. In one aspect, a client machine and a mobile computing device are provided. The client machine is configured to execute a browser application. The mobile computing device is configured to host a web server application. When the client machine and the mobile computing device are connected, functions on the mobile computing device become available on the client machine via the interaction between the web server and the browser. When the client machine accesses an email or other message with referenced content, different portions of the system can be configured to select a particular pathway to actually fetch the content.

19 Claims, 22 Drawing Sheets

(56) References Cited

U.S. PATENT DOCUMENTS

| | | | |
|---|---|---|---|
| 7,526,572 B2 | 4/2009 | Omar et al. | |
| 7,552,172 B2* | 6/2009 | Corboy et al. | 709/203 |
| 7,634,572 B2 | 12/2009 | Nanduri et al. | |
| 7,917,505 B2* | 3/2011 | van Gent et al. | 707/732 |
| 7,941,784 B2 | 5/2011 | Shenfield et al. | |
| 8,032,938 B2* | 10/2011 | Lalonde et al. | 726/24 |
| 8,050,684 B2* | 11/2011 | Lewis et al. | 455/445 |
| 8,121,638 B2* | 2/2012 | Gisby et al. | 455/552.1 |
| 8,161,521 B1 | 4/2012 | Venable, Sr. | |
| 8,775,974 B2* | 7/2014 | Cowan et al. | 715/854 |
| 8,782,148 B2* | 7/2014 | Gnech et al. | 709/206 |
| 2006/0149846 A1 | 7/2006 | Schuba | |
| 2006/0168259 A1 | 7/2006 | Spilotro et al. | |
| 2006/0195539 A1* | 8/2006 | Nichols et al. | 709/206 |
| 2007/0013967 A1 | 1/2007 | Ebaugh et al. | |
| 2007/0072617 A1* | 3/2007 | Lewis et al. | 455/445 |
| 2007/0101405 A1 | 5/2007 | Engle et al. | |
| 2007/0118895 A1 | 5/2007 | Coskun et al. | |
| 2007/0124809 A1 | 5/2007 | Narin et al. | |
| 2007/0130279 A1 | 6/2007 | Thacher | |
| 2007/0180449 A1 | 8/2007 | Croft et al. | |
| 2008/0109871 A1 | 5/2008 | Jacobs | |
| 2008/0137593 A1 | 6/2008 | Laudermilch et al. | |
| 2008/0139199 A1* | 6/2008 | Plestid | 455/426.1 |
| 2008/0172449 A1 | 7/2008 | Bengtsson et al. | |
| 2008/0248834 A1 | 10/2008 | Chatterjee et al. | |
| 2009/0075697 A1 | 3/2009 | Wilson et al. | |
| 2009/0150665 A1 | 6/2009 | Kaippallimalil et al. | |
| 2009/0158420 A1 | 6/2009 | Ks et al. | |
| 2009/0182803 A1 | 7/2009 | Barton et al. | |
| 2009/0282423 A1 | 11/2009 | Smith et al. | |
| 2010/0037057 A1 | 2/2010 | Shim et al. | |
| 2010/0094996 A1 | 4/2010 | Samaha | |
| 2010/0153568 A1 | 6/2010 | Uola et al. | |
| 2010/0161960 A1 | 6/2010 | Sadasivan | |
| 2010/0169392 A1 | 7/2010 | Lev Ran et al. | |
| 2010/0186079 A1 | 7/2010 | Nice et al. | |
| 2010/0191624 A1 | 7/2010 | Sharir et al. | |
| 2010/0195539 A1 | 8/2010 | Tian et al. | |
| 2010/0220849 A1 | 9/2010 | Colbert et al. | |
| 2010/0281258 A1 | 11/2010 | Andress et al. | |
| 2010/0299518 A1 | 11/2010 | Viswanathan et al. | |
| 2010/0325419 A1 | 12/2010 | Kanekar | |
| 2011/0040848 A1 | 2/2011 | Xu | |
| 2011/0203491 A1 | 8/2011 | Poe | |
| 2011/0219129 A1 | 9/2011 | Allen et al. | |
| 2011/0265151 A1 | 10/2011 | Furlan et al. | |
| 2011/0289134 A1 | 11/2011 | de Los Reyes et al. | |
| 2011/0316698 A1 | 12/2011 | Palin et al. | |
| 2012/0002813 A1 | 1/2012 | Wei et al. | |
| 2012/0079122 A1 | 3/2012 | Brown et al. | |
| 2012/0144019 A1 | 6/2012 | Zhu et al. | |
| 2012/0173901 A1 | 7/2012 | Soliman et al. | |
| 2012/0246484 A1 | 9/2012 | Blaisdell et al. | |
| 2012/0303476 A1 | 11/2012 | Krzyzanowski et al. | |
| 2013/0219471 A1 | 8/2013 | Brown et al. | |
| 2013/0316682 A1 | 11/2013 | Vieira | |

FOREIGN PATENT DOCUMENTS

| | | |
|---|---|---|
| WO | 2008042474 | 4/2008 |
| WO | 2009089626 | 7/2009 |
| WO | 2009102527 | 8/2009 |
| WO | 2010053999 | 5/2010 |
| WO | 2010129516 | 11/2010 |

OTHER PUBLICATIONS

You have got Hypertext, Schraefel, Journal of Digital Information, vol. 5, No. 1, 2004, 17 pages.

International Searching Authority, International Search Report and Written Opinion issued in PCT/CA2011/050573, 8 pages, mailed on Nov. 17, 2011.

International Searching Authority, Written Opinion and International Search Report issued in PCT/CA2011/050572, mailed on Nov. 9, 2011, 7 pages.

International Searching Authority, International Search Report and Written Opinion issued in PCT/CA2011/050548, mailed on Dec. 9, 2011, 10 pages.

International Searching Authority, International Search Report and Written Opinion issued in PCT/CA2011/050574, mailed on Dec. 19, 2011, 13 pages.

Patent Cooperation Treaty, International Search Report and Written Opinion, Corrected Version, issued in International Application No. PCT/CA2011/050548, dated May 24, 2012, 10 pages.

I-Jetty, Welcome! Welcome to the i-jetty console!, retrieved from the Internet on Apr. 6, 2011, 1 page.

Wikipedia, AJax (programming), http://en.wikipedia.org/wiki/Ajax_(programming), last modified on Jul. 29, 2011, 5 pages.

Wikipedia, Comet (programming), http://en.wikipedia.org/wiki/Comet_(programming), last modified on Jul. 4, 2011, 6 pages.

Feedfury, Android Colosseum, Interview: WebTide Developers speaks i-jetty and Google Android, Apr. 4, 2008, 4 pages.

Into Mobile, Run a web-server on your Android mobile phone with iJetty, Internet posting dated Mar. 17, 2008, 11 pages.

Nokia Betalabs, Moblie Web Server, retrieved from the Internet Apr. 4, 2011, 2 pages.

Cute Android, Open Source Android Apps for Developers: I-Jetty (webserver for the android mobile platform), retrieved from www.cuteandroid.com, retrieved from the Internet on Apr. 6, 2011, 9 pages.

I-Jetty, I-Jetty: webserver for the android mobile platform, downloads page, powered by Google Project Hosting, retrieved from the internet on Apr. 6, 2011, 1 page.

I-Jetty, I-Jetty: webserver for the android mobile platform, Creating Downloadable WebApps, powered by Google Project Hosting, retrieved from the internet on Apr. 6, 2011, 7 pages.

Phonemag, i-Jetty turns Android cellphone into mobile webserver, www.phonemag.com, posted Mar. 17, 2008, 6 pages.

Ajax Push Engine, What is Ape, http://www.ape-project.org/about.html, retrieved from the internet on Aug. 2, 2011, 2 pages.

Sofotex, Idokorro Mobile Desktop, http://www.sofotex.com/Idokorro-Mobile-Desktop-download_L38662.html, retrieved from the Internet on Aug. 2, 2011, 5 pages.

Super Shareware, TS Mobiles 2.1.4, http://www.supershareware.com/info/tsmobiles.html, retrieved from the Internet on Aug. 5, 2011, 3 pages.

Wikipedia, Apache HTTP Server, http://en.wikipedia.org/wiki/Apache_web_server, retrieved from the internet on Aug. 5, 2011, 4 pages.

Wikiwebserver, What is WikiWebServer?, http://www.wikiwebserver.org/, retrieved from the internet on Aug. 5, 2011, 2 pages.

Nokia, Mobile Web Server: How to Develop Content, Version 1.0; May 29, 2007, 23 pages.

Shenfield et al., U.S. Appl. No. 11/078,331, System and Method for Generating Component Based Applicatons, filed with the USPTO on Mar. 14, 2005, 111 pages.

Nanduri et al., U.S. Appl. No. 11/313,771, Browser Plugin Based Method for Advanced HTTPs Data Processing, filed with the USPTO on Dec. 22, 2005, 22 pages.

Chris Smith et al., U.S. Appl. No. 12/436,370, System and Method for Dynamic Plug-In Activation in a Web Browser, filed with the USPTO on May 6, 2009, 23 pages.

Sean Wilson et al., U.S. Appl. No. 13/033,194, System and Method for Interfacing Between a Mobile Device and a Personal Computer, filed with the USPTO on Feb. 18, 2008, 32 pages.

Salim H. Omar, U.S. Appl. No. 10/483,449, System and Method for Providing Remote Data Access for a Mobile Communication Device, filed with the USPTO on Jan. 8, 2004, 17 pages.

June Fabrics Technology Inc., Pdanet for Android FAQs, internet article, Copyright 2003-2010, 2 pages.

Todd Rosenberry, Sans Institute, Protecting Your Corporate Network from Your Employee's Home Systems, GIAC Security Essentials Certification, Version 1.4b, Option 1, Dec. 21, 2003, 24 pages.

Stack Overflow, Comet for User based Notification over a Message Queue questions, asked Jun. 24, 2010, 1 pages.

(56) References Cited

OTHER PUBLICATIONS

Russell et al., The Bayeux Specification, Bayeux Protocol—Bayeux 1.0.0, http://svn.cometd.com/trunk/bayeux/bayeux.html, 2007, 25 pages.
Seopher, Multiple AJAX responses with 1 request (mootools and PHP), internet article, posted on Dec. 22, 2007 at 12:10 in Tutorials, 9 pages.
Member Wiki, Simple Protocol for Ajax Push, www.openajax.org, page last modified on Jun. 20, 2007, 3 pages.
International Searching Authority, International Search Report, revised version, issued in International application No. PCT/CA2011/050548, dated Aug. 2, 2012, 3 pages.
United States Patent and Trademark Office, Office action issued in U.S. Appl. No. 13/204,227, dated Mar. 1, 2013, 50 pages.
United States Patent and Trademark Office, "Final Rejection," issued in connection with U.S. Appl. No. 13/204,227, on Sep. 12, 2013, 24 pages.
United States Patent and Trademark Office, "Advisory Action," issued in connection with U.S. Appl. No. 13/204,227, on Nov. 19, 2013, 2 pages.
United States Patent and Trademark Office, "Non-Final Office Action," issued in connection with U.S. Appl. No. 13/563,447, on Jul. 8, 2013, 21 pages.
United States Patent and Trademark Office, "Final Rejection," issued in connection with U.S. Appl. No. 13/563,447, on Feb. 28, 2014, 30 pages.
Patent Cooperation Treaty, "International Search Report," issued in connection with International Patent Application No. PCT/CA2013/050128, on May 17, 2013, 3 pages.
Patent Cooperation Treaty, "Written Opinion," issued in connection with International Patent Application No. PCT/CA2013/050128, on May 17, 2013, 4 pages.
European Patent Office, "Extended European Search Report," issued in connection with European Patent Application No. 12179015.8, Jun. 6, 2013, 10 pages.
Patent Cooperation Treaty, "International Preliminary Report on Patentability," issued in connection with International Patent Application No. PCT/CA2011/050547, on Apr. 2, 2013, 7 pages.
Patent Cooperation Treaty, "International Preliminary Report on Patentability," issued in connection with International Patent Application No. PCT/CA2011/050548, on May 26, 2013, 6 pages.
Korean Patent Office, "Office Action," issued in connection with Korean Patent Application No. 10-2013-7007787, on Feb. 21, 2014, 4 pages.
European Patent Office, "Extended European Search Report," issued in connection with European Patent Application No. 11810984.2, Nov. 7, 2013, 8 pages.
Blackberry, "BlackBerry PlayBook Tablet Version: 1.0 Security Technical Overview," Sep. 8, 2011, XP055064365, retrieved from the Internet on May 28, 2013, 46 pages.
Blackberry, "BlackBerry Device Service Feature and Technical Overview Version: 6.0," Feb. 16, 2012, XP055064082, retrieved from the Internet on May 24, 2013, 24 pages.
United States Patent and Trademark Office, "Advisory Action," issued in connection with U.S. Appl. No. 13/563,447, on May 14, 2014, 4 pages.
United States Patent and Trademark Office, "Non-Final Office Action," issued in connection with U.S. Appl. No. 13/563,447, on Jun. 30, 2014, 64 pages.
Canadian Intellectual Property Office, "Office Action," issued in connection with application No. CA 2,784,664, on Jul. 7, 2014, 2 pages.
International Bureau, "International Preliminary Report on Patentability," issued in connection with application No. PCT/CA2013/050128, mailed on Sep. 4, 2014, 6 pages.
Korean Intellectual Property Office, "Final Rejection," issued in connection with application No. KR 10-2013-7007787, on Aug. 28, 2014, 3 pages.
European Patent Office, "Extended European Search Report," issued in connection with application No. EP 11810984.2, on Nov. 7, 2013, 8 pages.
Canadian Intellectual Property Office, "Office Action," issued in connection with application No. CA 2,812,659, on Sep. 25, 2014, 2 pages.
State Intellectual Property Office of People's Republic of China, "Office Action," issued in connection with application No. CN 201180056924.8, on Jan. 4, 2015, 9 pages.
Korean Intellectual Property Office, "Notice of Allowance," issued in connection with application No. KR 10-2013-7007787, on Dec. 11, 2014, with English translation, 3 pages.
United States Patent and Trademark Office, "Notice of Allowance and Fee(s) Due," issued in connection with U.S. Appl. No. 13/563,447, on Dec. 23, 2014, 10 pages.
Sadeghzadeh et al., "Notice of Violation of IEEE Publication Principles a New Secure Scheme Purposed for Recognition and Authentication Protocol in Bluetooth Environment," Feb. 2010, IEEE, p. 1326-1331.
Parmar et al., "Firmware for File Transfer Between Bluetooth Module and Flash Memory Through Microcontroller in an Emerging Concept of Wireless Portable Memory Access," 2010, IEEE, p. 42-46.
Aalto et al., "Bluetooth and WAP Push Based Location-Aware Mobile Advertising System," Jun. 2004, ACM, p. 49-58.
Sanchez et al., "BlueMall: A Bluetooth-based Advertisement System for Commercial Areas," Oct. 2008, ACM, p. 17-22.

\* cited by examiner

METHOD, APPARATUS AND SYSTEM FOR ACCESSING APPLICATIONS AND CONTENT ACROSS A PLURALITY OF COMPUTERS

This application claims the benefit of U.S. Provisional Application No. 61/386,635, filed Sep. 27, 2010, the entire content of which is hereby expressly incorporated by reference.

FIELD OF THE DISCLOSURE

The present specification relates generally to computing devices and more particular relates to a method, apparatus, and system for accessing applications and content across a plurality of computers.

BACKGROUND

The evolution of computers is currently quite active in the mobile device environment. It is now well-known to include calendaring, contacts, and messaging functions in mobile devices. More recently, there has been a veritable explosion of the number and type of applications that are configured to the unique form factors and computing environments of mobile devices.

BRIEF DESCRIPTION OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1:
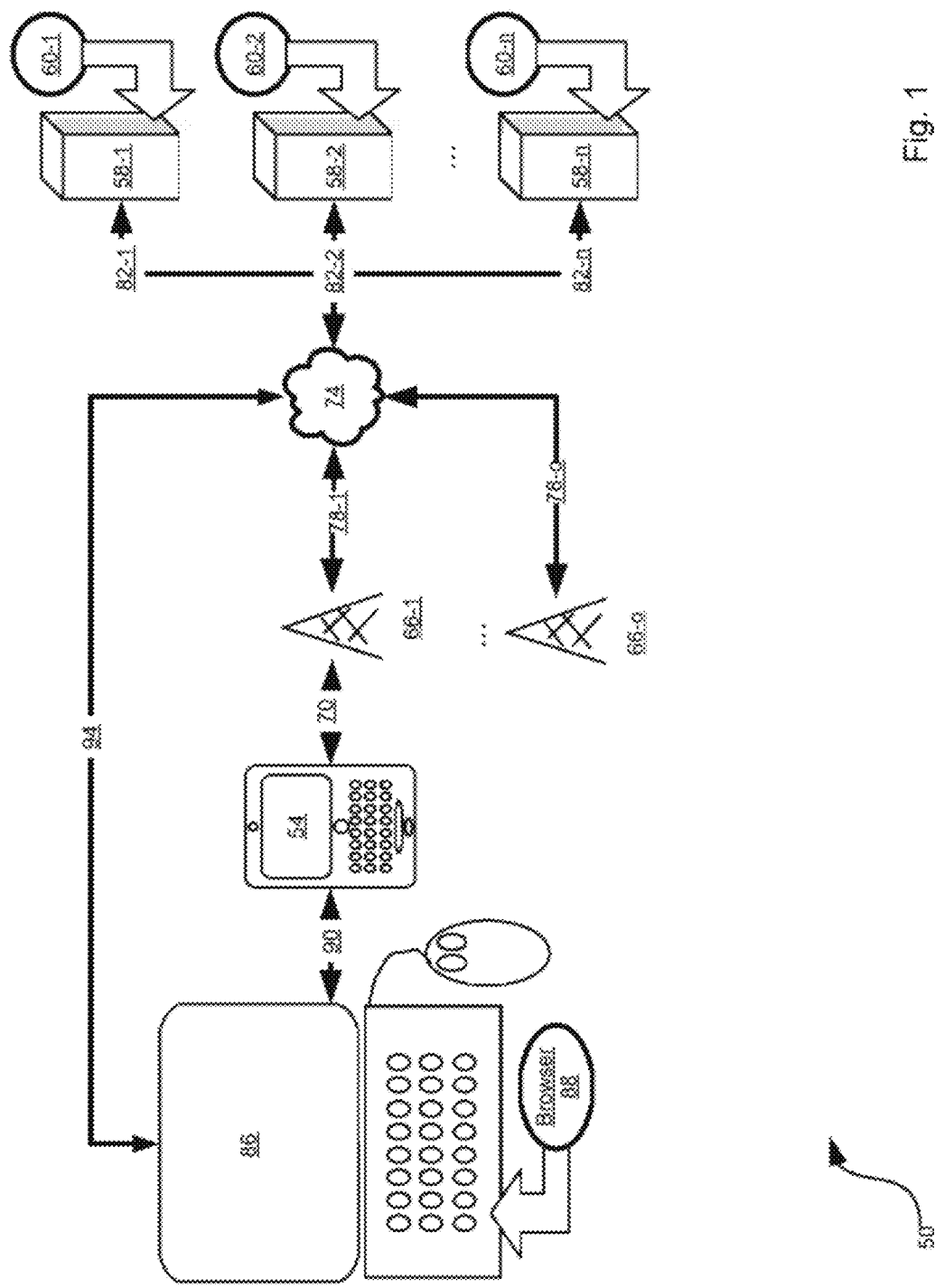
FIG. 1 is a schematic representation of a system for accessing an application across a plurality of computers.

Referring now to FIG. 1, a system for accessing an application across a plurality of computers is indicated generally at 50. In a present embodiment system 50 comprises at least one computing device in the form of a mobile computing device 54 and at least one server 58-1, 58-2 . . . 58-$n$. (Generically, server 58, and collectively, servers 58. This nomenclature is used elsewhere herein).

A wireless link 70 connects mobile computing device 54 with one of a plurality of wireless base stations 66. In FIG. 1, mobile computing device 54 is shown as connecting to a first base station 66-1 via wireless link 70, but mobile computing device 54 can also connect to other base stations 66 in system 50. Backhaul links 78 connect each base station 66 to a network 74. Additional backhaul links 82 connect network 74 to each server 58.

Mobile computing device 54 can be any type of electronic device that can be used in a self-contained manner and to interact with content available on network 74. Interaction includes displaying of information on mobile computing device 54 as well as to receive input at mobile computing device 54 that can in turn be sent back over network 74. Mobile computing device 54 will be explained in greater detail below.

It should now be understood that the nature of network 74 and links 70, 78, and 82 associated therewith is not particularly limited and are, in general, based on any combination of architectures that will support interactions between mobile computing device 54 and servers 58. In a present embodiment network 74 includes the Internet as well as appropriate gateways and backhauls to links 78 and 82. For example, backhaul links 78 and backhaul links 82 can be based on a T1, T3, O3, or any other suitable wired or wireless connections. Accordingly, the links 78 and 82 between network 74 and the interconnected components are complementary to functional requirements of those components.

Link 70 may be based on, by way of non-limiting examples, a core mobile network infrastructure, such as, by way of non-limiting examples, one or more of Global System for Mobile communications ("GSM"); Code Division Multiple Access ("CDMA"); CDMA 2000; 3G; or Evolution-Data Optimized or Evolution-Data ("EVDO"); or successors thereto or hybrids or combinations thereof; or on a wireless local area network ("WLAN") infrastructures such as, by way of non-limiting examples, the Institute for Electrical and Electronic Engineers ("IEEE") 802.11 Standard (and its variants) or Bluetooth or the like or hybrids or combinations thereof. Note that in an example variation of system 50 it is contemplated that link 70 may be a wired connection.

A client machine 86 also connects to mobile computing device 54 via a link 90, which may be an encrypted link. In a present example implementation, client machine 86 is a desktop, tablet, notebook, or laptop computer and link 90 is a direct connection effected wirelessly or wired. Where link 90 is wireless, then link 90 can be, for example, a Bluetooth™ or a peer-to-peer Wi-Fi connection between client machine 86 and mobile computing device 54. Where link 90 is wired, then link 90 can be, for example, a universal serial bus (USB) or FireWire™ connection. Those skilled in the art will now recognize other types of wired or wireless connections that can be used to effect a direct connection for link 90. In variations, link 90 can be effected indirectly through, for example, a local area network or a Wi-Fi network, or even through a wide area network such as network 74.

Client machine 86 is initially configured to maintain or execute at least a web browser application 88, and need not have direct access to network 74, though in some cases such a direct connection to network 74 would be possible through a link 94. Those skilled in the art should recognize that what constitutes a "web browser application" is not particularly limited to well-recognized browsers such as Firefox™, Internet Explorer™, Chrome™, Opera™ or Safari™ or mini-browsers employed on portable electronic devices. The use of such well-recognized browser applications is contemplated, but likewise, so are any applications, or operating systems, or other software modules that can make HTTP requests and receive HTTP content. Thus, notwithstanding some of the specific examples discussed below, it is contemplated that web browser application 88 may not actually have the traditional graphical interface of a well-recognized web browser application. Accordingly, client machine 86 can be based on any computing environment that provides web browsing functionality. For example, such a computing environment can be based on an Intel™ or AMD™ or other microprocessor, with accompanying volatile storage (e.g. random access memory) and non-volatile storage (e.g. Flash, Hard disc drive), read only memory (ROM), network interface card(s), video cards that connect to one or more displays, a keyboard, a mouse (or other pointing device). Any operating system may be used, including, for example, an operating system offered by Microsoft™, or a Linux™ operating system, or an operating system offered by Apple Computer. Browser application 86 can be any browser application can be used that is executable on a respective operating system, including Firefox™, Internet Explorer™, Chrome™, Opera™ or Safari™. Client machine 86 can have a display or a keyboard or both that are larger than that provided on mobile computing device 54. Client machine 86 may also have another configuration, such as a tablet computing device. One non-limiting example of a tablet configuration comprises a pointing device in the form of a touch screen, a WiFi network interface that communicates over link 94, which itself is a WiFi link. In this configuration, link 90 may either be a USB connection or a Bluetooth connection or a WiFi, with computing machine 86 and device 54 having suitable network interfaces for same. As a variation on the foregoing, link 94 may be implemented as a core mobile network link, like link 70. As a further variation on the foregoing, computing machine 86 may comprise network interfaces to accommodate a plurality of links directly to network 74, including a WiFi link and a core mobile network link. Other variations will now occur to those skilled in the art.

Servers 58 can be based on any well-known server environment including a module that houses one or more central processing units, volatile memory (e.g. random access memory), persistent memory (e.g. hard disk devices), and network interfaces to allow servers 58 to communicate over network 74. For example, each server 58 can be a ProLiant® Server from Hewlett-Packard Company, 3000 Hanover Street Palo Alto, Calif. 94304-1185 USA having a plurality of central processing units and having several gigabytes of random access memory. However, it is to be emphasized that this particular server is merely a non-limiting example, and a vast array of other types of computing environments for each server 58 is contemplated. Furthermore, it is contemplated that each server 58 may be implemented as a plurality of interconnected servers, in a so-called server farm, which are mirrored or otherwise configured for load balancing or failover or high availability or any or all of those.

As will be discussed further below, each server 58 maintains a different networking application 60. Networking applications 60 can be any application whereby a corresponding client-side application executes on mobile computing device 54 which accesses data or any other server functions on a given server 58. Networking applications can be, by way of non-limiting examples, personal information management applications, social networking applications, or messaging applications. Non-limiting examples of personal information management applications include calendaring and contact management applications. Non-limiting examples of social networking application 60 include Facebook™, Twitter™, LinkedIn™, and MySpace™. Networking applications 60 can also comprise message applications such email, BlackBerry Messenger, AOL instant messenger (AIM), Yahoo Messenger (YM), Google Talk (Gtalk), Lotus Connections, Windows Live Messenger. There are many others.

Figure 2:
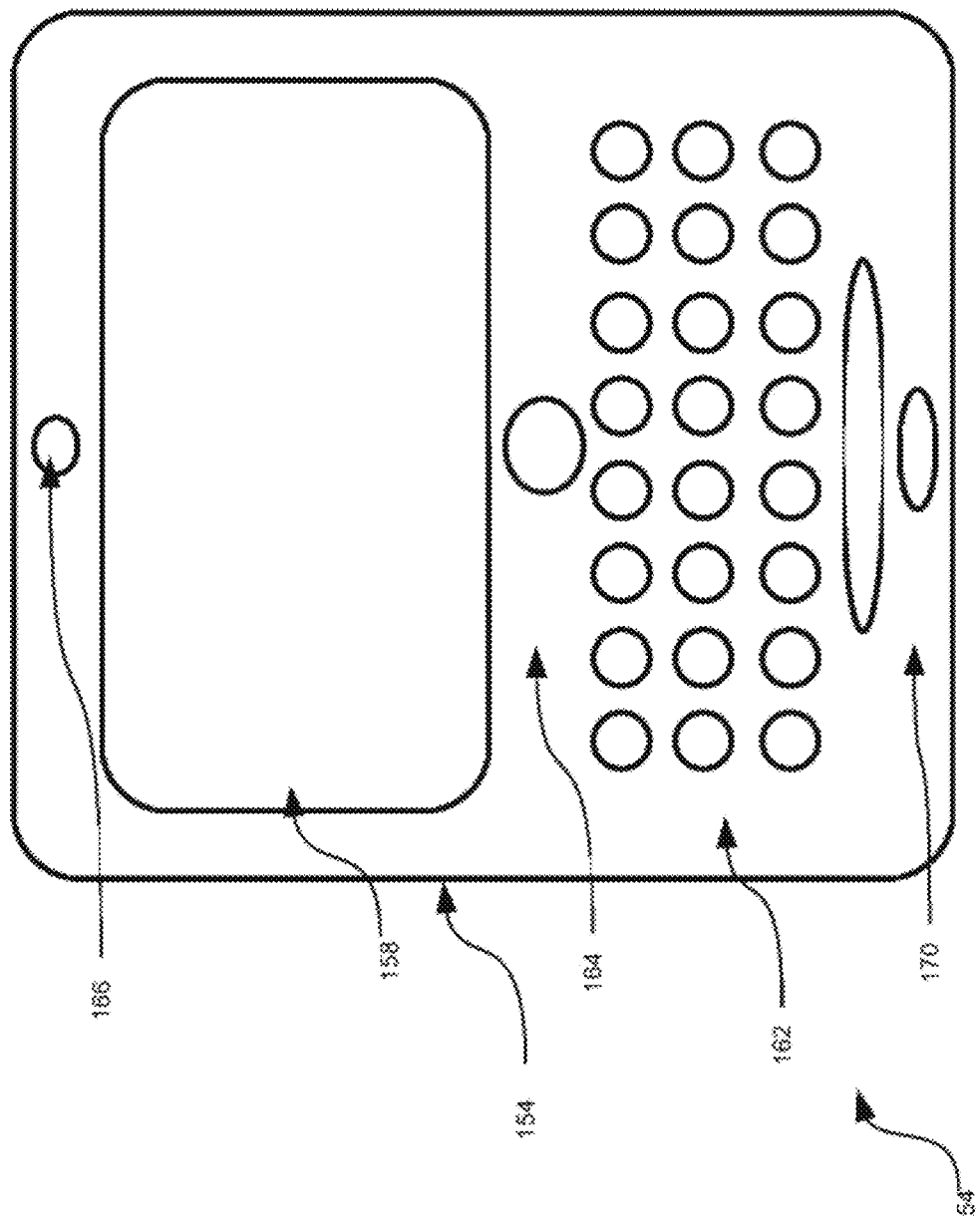
FIG. 2 is a representation of a front view of the mobile computing device of the system of FIG. 1.
Figure 3:
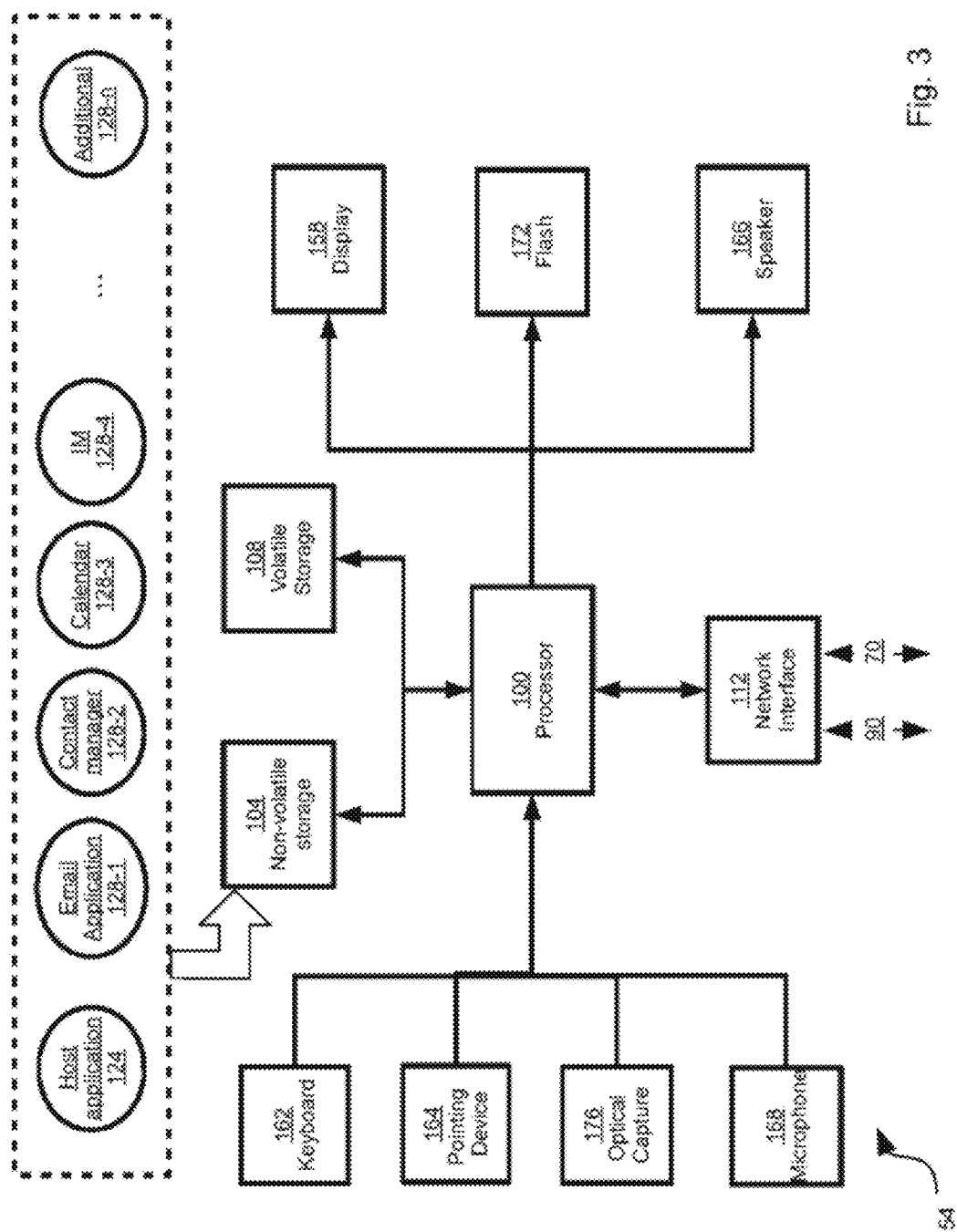
FIG. 3 is a block diagram of the device shown in FIG. 1.

FIG. 2 and FIG. 3 show different views and representations of a non-limiting example of a mobile computing device 54 which can execute one or more applications as discussed in greater detail below. It is to be understood that mobile computing device 54 is an example, and it will be apparent to those skilled in the art that a variety of different portable electronic device structures are contemplated. Indeed variations on mobile computing device 54 can include, without limitation, a cellular telephone, a portable email paging device, a network enabled digital camera, a portable music player, a portable video player, a portable video game player.

Referring to FIG. 2, in a present, non-limiting example, device 54 comprises a chassis 154 that supports a display 158. Display 158 can comprise one or more light emitters such as an array of light emitting diodes (LED), liquid crystals, plasma cells, or organic light emitting diodes (OLED). Other types of light emitters are contemplated. Chassis 154 also support a keyboard 162. It is to be understood that this specification is not limited to any particular structure, spacing, pitch, or shape of keyboard 162, and the depiction in FIG. 2 is an example. For example, full or reduced "QWERTY" keyboards are contemplated. Other types of keyboards are contemplated. (In variations, device 54 may also be a touch-screen device with no physical keyboard.) Device 54 also comprises a pointing device 164 which can be implemented as a touch-pad, joystick, trackball, track-wheel, or as a touch sensitive membrane on display 158. Device 54 may also comprise a speaker 166 for generating audio output, and a microphone 68 for receiving audio input.

FIG. 3 shows a schematic block diagram of the electronic components of device 54. It should be emphasized that the structure in FIG. 3 is an example. Device 54 includes a plurality of input devices which in a present embodiment includes keyboard 162, pointing device 64, and microphone 168 and an optical capture unit 176. Fewer, additional, or alternative input devices are contemplated. Input from keyboard 162, pointing device 164 and microphone 168 and optical capture unit 176 is received at a processor 100. Processor 100 can be configured to execute different programming instructions that can be responsive to the input received via input devices. To fulfill its programming functions, processor 100 is also configured to communicate with a non-volatile storage unit 104 (e.g. Erase Electronic Programmable Read Only Memory ("EEPROM"), Flash Memory) and a volatile storage unit 108 (e.g. random access memory ("RAM")). Programming instructions that implement the functional teachings of device 54 as described herein are typically maintained, persistently, in non-volatile storage unit 104 and used by processor 100 which makes appropriate utilization of volatile storage 108 during the execution of such programming instructions.

Processor 100 in turn is also configured to control display 158, speaker 166 and flash 172, also in accordance with different programming instructions and optionally responsive to different input receive from the input devices. Fewer, additional, or alternative output devices are contemplated.

Processor 100 also connects to a network interface 112, which can be implemented in a present embodiment as one or more radios configured to communicate over link 70 and link 90. Network interface 112 can thus be generalized as a further input/output device that can be utilized by processor 100 to fulfill various programming instructions. It will be understood that interface 112 is configured to correspond with the network architecture that defines each link 70 and link 90. It is also contemplated each network interface 112 can include multiple radios to accommodate the different protocols that may be used to implement different types of links where the network architecture for each link 70 differs between base stations 66, or where link 90 may be based on different architectures. For example, link 90 may also be a wired link (e.g. USB) in which case it may not have a radio at all.

In a present embodiment, device 54 is also configured to maintain, within non-volatile storage 104, a host application 124, and one or more client applications 128 such as an email application 128-1, a contact manager application 128-2, a calendar application 128-3, an instant messenger application 128-4 or one or more of a plurality of additional applications 128-n. Non-limiting examples of additional applications 132 can comprise, without limitation, one or more of social networking client applications, e.g., Twitter, Facebook, MySpace, LinkedIn; other applications associated with online communities e.g., Flickr, Gtalk, etc.; document tools such as Google Docs. Any one or more of host application 124 and client applications 128 can be pre-stored in non-volatile storage 104 upon manufacture of device 54, or downloaded via network interface 112 and saved on non-volatile storage 104 at any time subsequent to manufacture of device 54. Each application 128 is also configured to interact with its corresponding network application 60 as needed.

Processor 100 is configured to execute each application 128, making use of input from input devices and controlling display 158 to generate output based on that input and according to the programming instructions of each application 128. In general, each application 128 can be based on any existing or future application 128 that can be executed entirely on a device such as device 54, even when link 90 is not active and device 54 is disconnected from client machine 86. For example, email application 54 can be a standard electronic mail application that is already commonly deployed on various devices such as device 54 and entirely usable on device 54, without any connection to client machine 86, and while accessing servers 58 as needed. Likewise contact manager application 128-2, calendar application 128-3, instant messenger application 128-4 and any of the additional applications 128-n can be based on such applications that are already commonly deployed, or may be deployed in the future, and entirely usable on device 54 without any connection to client machine 86, and while accessing servers 58 as needed.

Processor 100 is also configured to execute host application 124 to permit access to client applications 128 via client machine 86, when link 90 is active, as will be explained further below.

Figure 4:
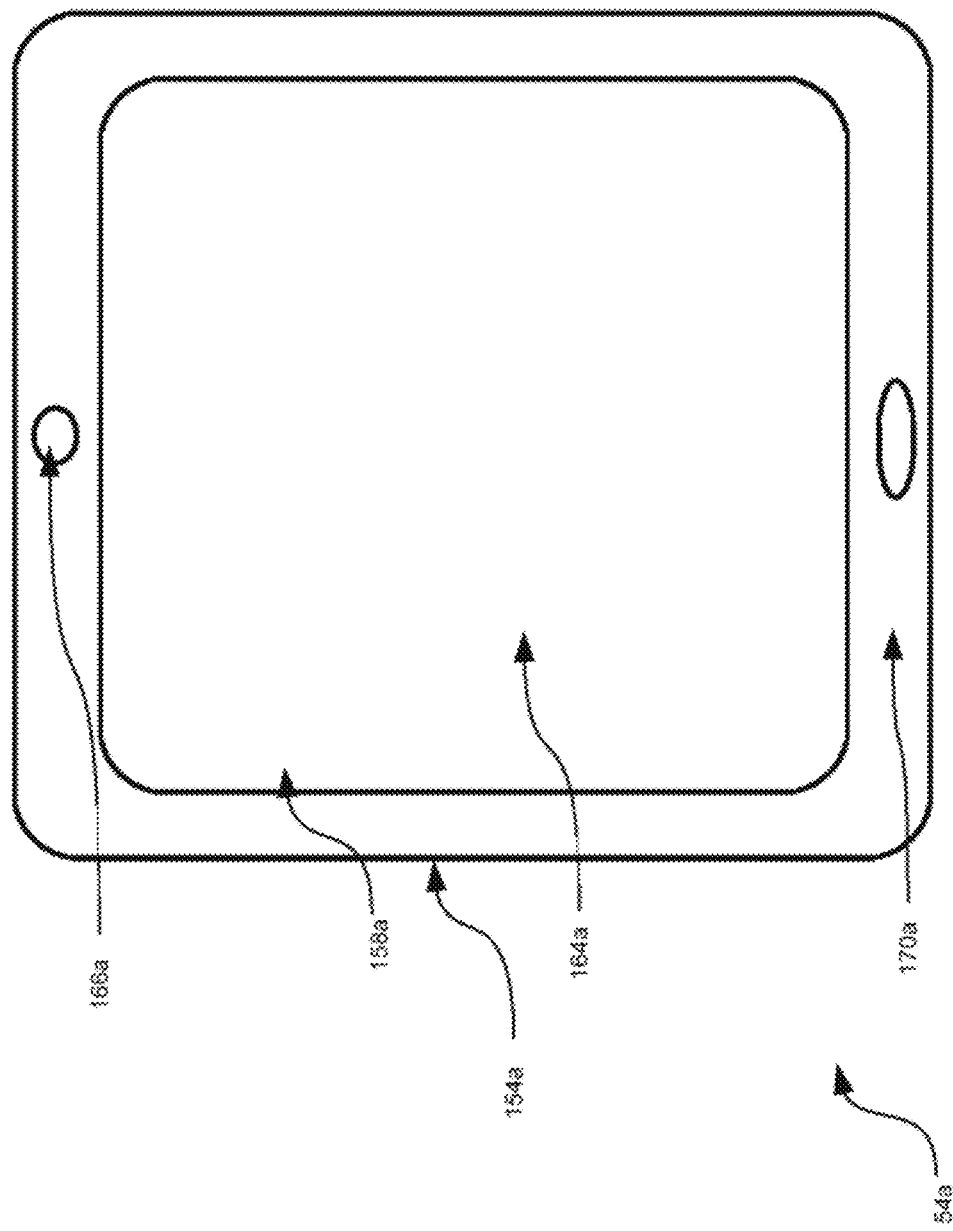
FIG. 4 is a representation of a variation of the mobile computing device of FIG. 1.

Referring briefly to FIG. 4, a variation on device 54 is indicated generally as device 54a. Device 54a comprises many of the same components as device 54, and therefore like components bear like references except followed by the suffix "a." Of note is that device 54a excludes keyboard 162 and pointing device 164. Instead, device 54a comprises a touch screen 164a which provides the combined functionality of keyboard 162 and pointing device 164. Further variations on device 54 will now occur to those skilled in the art, but for convenience, further discussion of the present specification will focus on device 54 as described above. As will become apparent from further discussion herein, the lack of a full keyboard in device 54a presents certain limitations for providing input to device 54a, and those limitations may be mitigated by the present specification.

Figure 5:
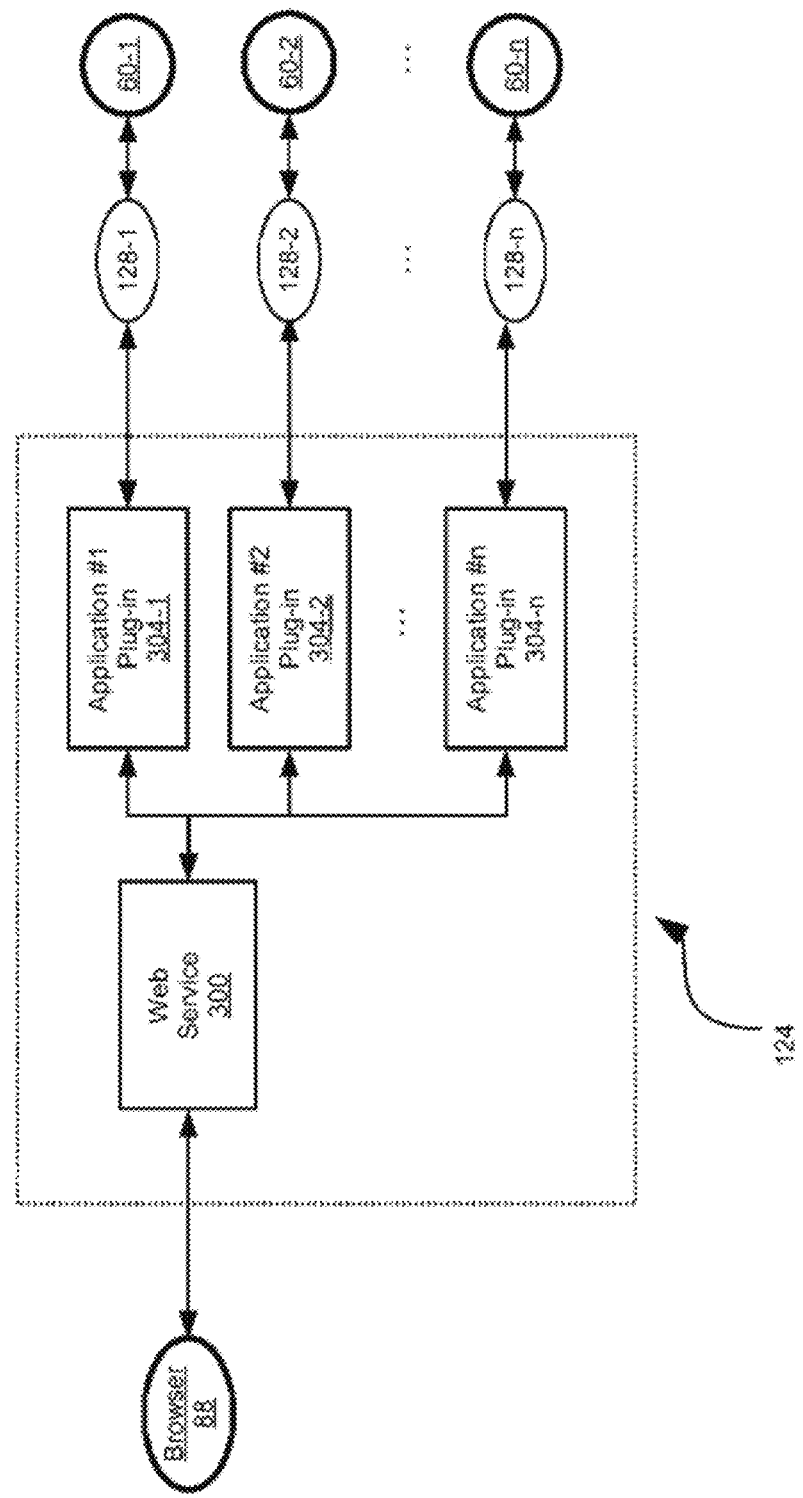
FIG. 5 is a block diagram showing a non-limiting example of the host application in FIG. 3.

FIG. 5 shows a block diagram of an example an implementation of host application 124 and its virtual connections to browser 88 and applications 128. The virtual connections between applications 128 are also shown to applications 60. Those skilled in the art will now recognize that the components and connections in FIG. 5 can be implemented using the hardware structures shown in FIG. 1, or variations thereon. Host application 124 thus comprises a web service 300 and a plurality of application plug-ins 304. Web service 300 is configured to generate and serve content to browser 88, on behalf of each application 128 via respective application plug-ins 304. Application plug-ins 304 is configured to act as programming interfaces between web service 300 and applications 128. Accordingly, each application plug-in 304 is uniquely configured for its corresponding application 128, so that web service 300 can generate hypertext markup language (HTML), as desired, and any other code (e.g. JavaScript files, Cascading Style Sheets) that are usable by browser 88, so that graphical interfaces can be generated on client machine 86 for each application 128. According to this implementation, no modification to each application 128 is needed in order to provide access to those applications 128 via browser 88. Instead, access to a particular application 128 can be provided on browser 88 by creating a plug-in 304 for that particular application 128. Alternatively, a plug-in 304 may be implemented as a component of a particular application 128.

Figure 6:
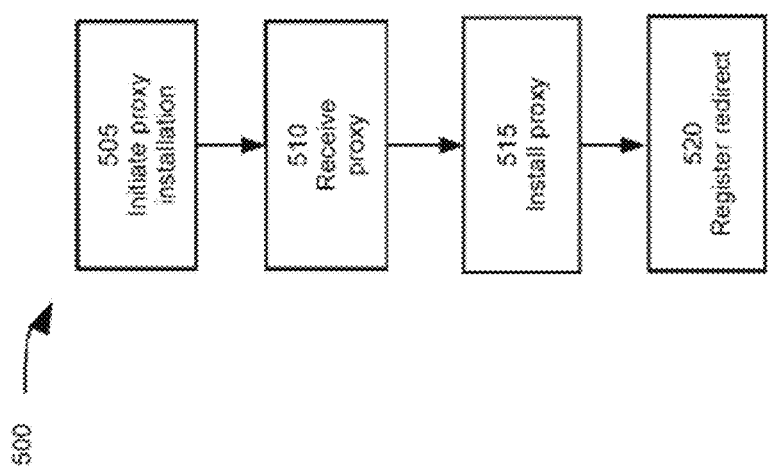
FIG. 6 is a flow-chart depicting a method of installing a proxy application.

Referring now to FIG. 6, a flow-chart depicting a method for provisioning a client machine to interact with a mobile electronic device is indicated generally at 500. Method 500 can be implemented using system 50, and for purposes of explaining method 500 it will be assumed that method 500 is performed using system 50. However, it is to be understood that variations are contemplated to both method 500 and system 50 and such variations are within the scope of this specification. Method 500 is not strictly required, but in a present implementation method 500 provides a proxy on client machine 86 such that web service 300 is addressable and reachable from the address bar in browser 88. Method 500 also assumes that link 90 is a direct link between client machine 86 and mobile electronic device 54. Again, such a direct connection for link 90 can be a peer-to-peer Bluetooth™ connection whereby client machine 86 and device 54 are "paired" using known Bluetooth™ hardware and network protocols. Such a direct connection for link 90 can also be a USB cable connection. Other means for implementing link 90 will now occur to those skilled in the art. In a present implementation, it is assumed that link 90 is a Bluetooth™ connection.

Block 505 comprises receiving an instruction to install a proxy application. Block 505 can be implemented in different ways. One factor that affects how block 505 is implemented is the location where the installation file for the proxy application is stored. In one implementation, the proxy application is stored on a server (possibly one or more of servers 58, though not necessarily) connected to network 74, in which case installation initiation may be effected by entering a uniform resource locator (URL) into browser 88 that points to the network 74 address of the server that stores the proxy application. In another implementation, the proxy application is stored as a data file within persistent storage 104 of device 54. In this implementation, non-volatile storage 104 of device 54 is configured to appear as an external hard-disk when link 90 is active—this type of configuration being inherent in many operating systems and devices such as device 54, where link 90 is a USB connection. Thus, once device 54 appears as a hard-disk, the data file containing the proxy application can be downloaded via link 90 onto client machine 86. In variations, the proxy could be provided on a CD or other removable media.

Block 510 comprises receiving the proxy application for which installation was initiated at block 505. Where proxy application is stored on network 74, then block 510 comprises downloading the proxy application via network 74 and link 94. When proxy application is stored on device 54, then the proxy application is transferred via link 90 to client machine 86.

Those skilled in the art will now recognize other means of effecting block 505 and block 510.

Block 515 comprises installing the proxy application that was received at block 510. At this point it will be appreciated that the form in which proxy application is originally stored and received can vary according to the level of sophistication to be employed in the actual installation of the proxy application. It is presently contemplated that the proxy application will be an executable application that invokes an installation wizard, or the like, so that a simple series of key strokes on client machine 86 are all that is required to actually install the proxy application. However, proxy application can be received at block 510 in other forms.

Figure 7:
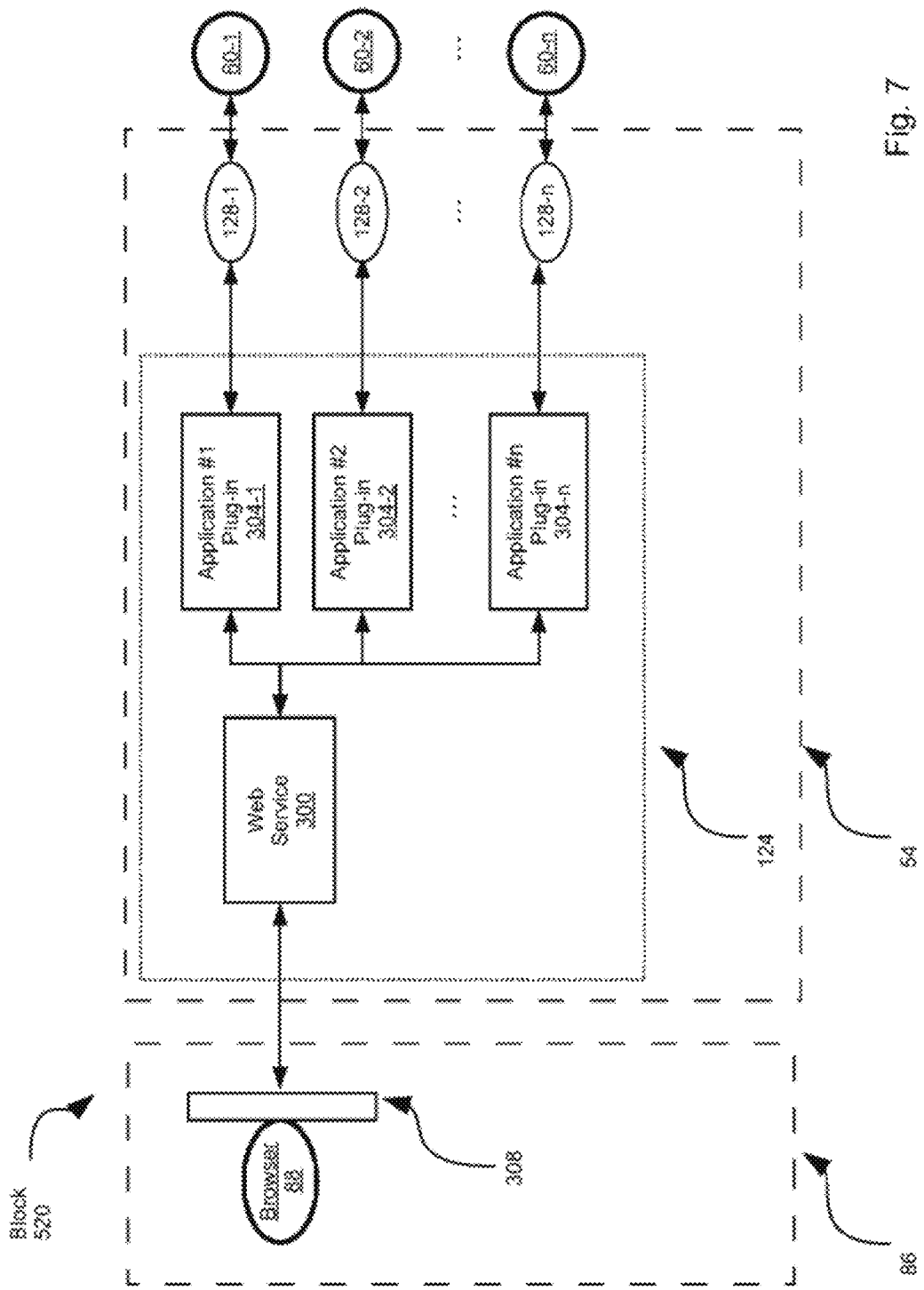
FIG. 7 shows an example of system 50 after installation of the proxy application according to the method of FIG. 6, using a variation of the block diagram in FIG. 5.

Block 520 comprises registering the proxy application installed at block 515. Such registration is local to the client machine and serves to identify a URL or Internet Protocol (IP) address redirect such that entry of that URL or IP addresses that causes browser 88 to access web service 300. A representation of portions of system 50 is shown in FIG. 7, which itself is a variation on FIG. 5. FIG. 7 is thus substantially the same as FIG. 5, except that a proxy application 308 is shown as being installed on client machine 86 and sitting between browser 88 and web service 300 on device 54. Expressed another way, proxy application 308 configures client machine 86 so that entry of a given URL or other address in the address bar of browser 88 directs browser 88 to connect with web service 300 and to generate a web page on the display of client machine 86 that corresponds to a web page being offered by web service 300. An example of such a URL may be, http://localhost, provided such a URL is not already reserved for another proxy application on client machine 86. Thus, upon entry of http://localhost, browser 88 will be directed to proxy 308 and in turn browser 88 will connect to web service 300. Returning to the example where link 90 is based on Bluetooth™, then proxy application 308 sits between the browser 88 and the Bluetooth service and drivers executing on client machine 86, and forms a virtual connection with device 54 according to the Bluetooth pairing that has been registered on the Bluetooth service of device 54. In turn, web service 300 is configured to respond to HTTP requests received via the Bluetooth service that is resident on device 54.

At this point it is to be reiterated that method 500 and the use of proxy application 308 is not needed in all implementations contemplated by this specification, and accordingly, certain of the following discussions may not make reference to proxy application 308 and FIG. 7. However, it is also to be understood that the following discussion is also applicable to configurations that utilize proxy application 308. Also, in some configurations, the proxy application 308 may be pre-installed on client machine 86, so that method 500 may be optional.

Figure 8:
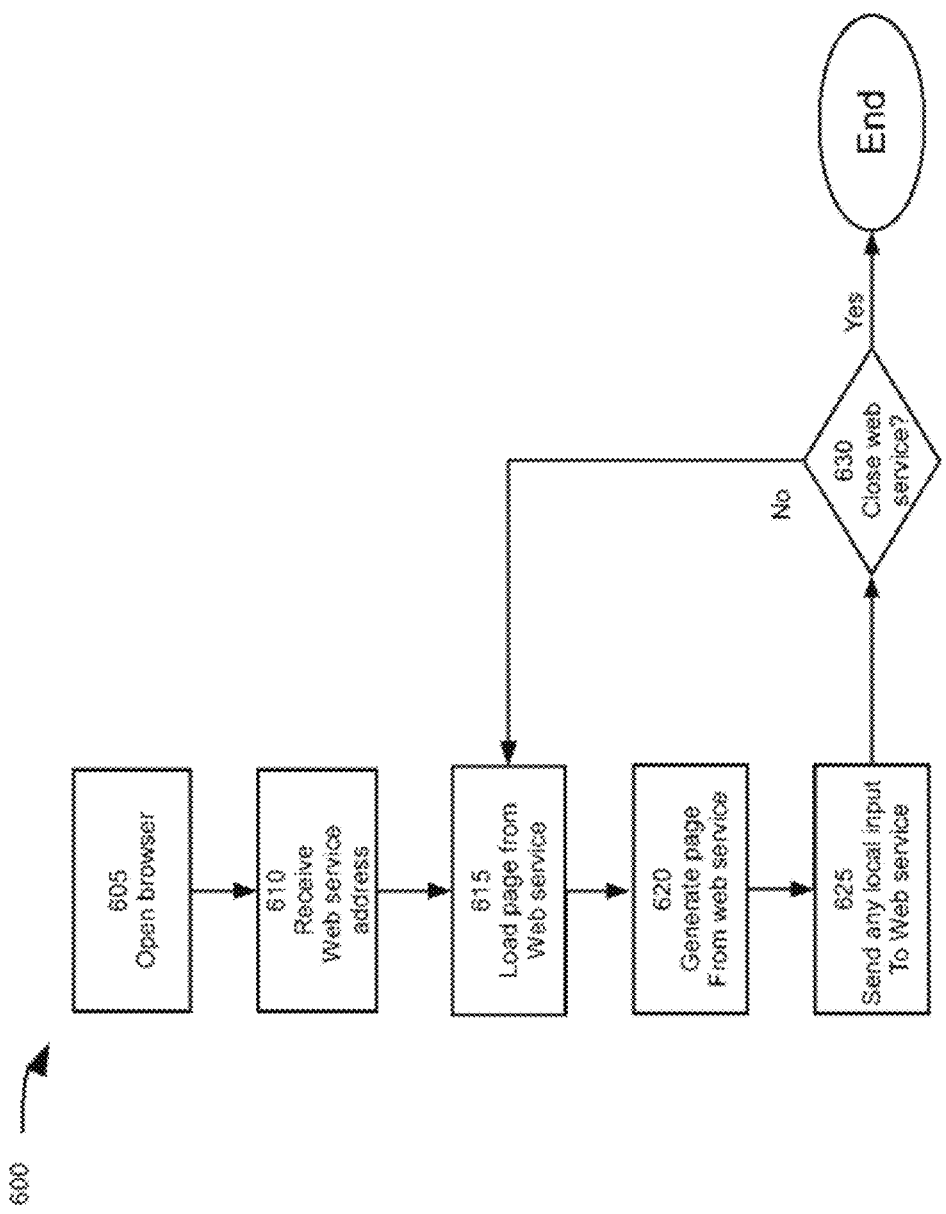
FIG. 8 shows a method of accessing an application across a plurality of computers.

Referring now to FIG. 8, a flow-chart depicting a method for accessing an application across a plurality of computers is indicated generally at 600. Method 600 can be implemented using system 50, and for purposes of explaining method 600 it will be assumed that method 600 is performed using system 50. However, it is to be understood that variations are contemplated to both method 600 and system 50 and such variations are within the scope of this specification. Performance of method 600 presumes that link 90 is active between device 54 and client machine 86.

Block 605 comprises opening a web browser. In system 50, block 605 is effected at client machine 86 whereby browser 88 is opened in the usual manner. Block 610 comprises receiving a web services address. Block 610 is effected by typing an address (e.g. http://localhost) into the address bar of browser 88. In system 50, the address received at block 610 corresponds to the address web service 300 of host application 124. In variations, it is contemplated that system 50 may be configured so that browser 88 is automatically launched and directed to the appropriate address in a single step: for example via a desktop shortcut on client machine 86. In variations, it is contemplated that the address bar of browser 88 is not visible to the user.

Figure 9:
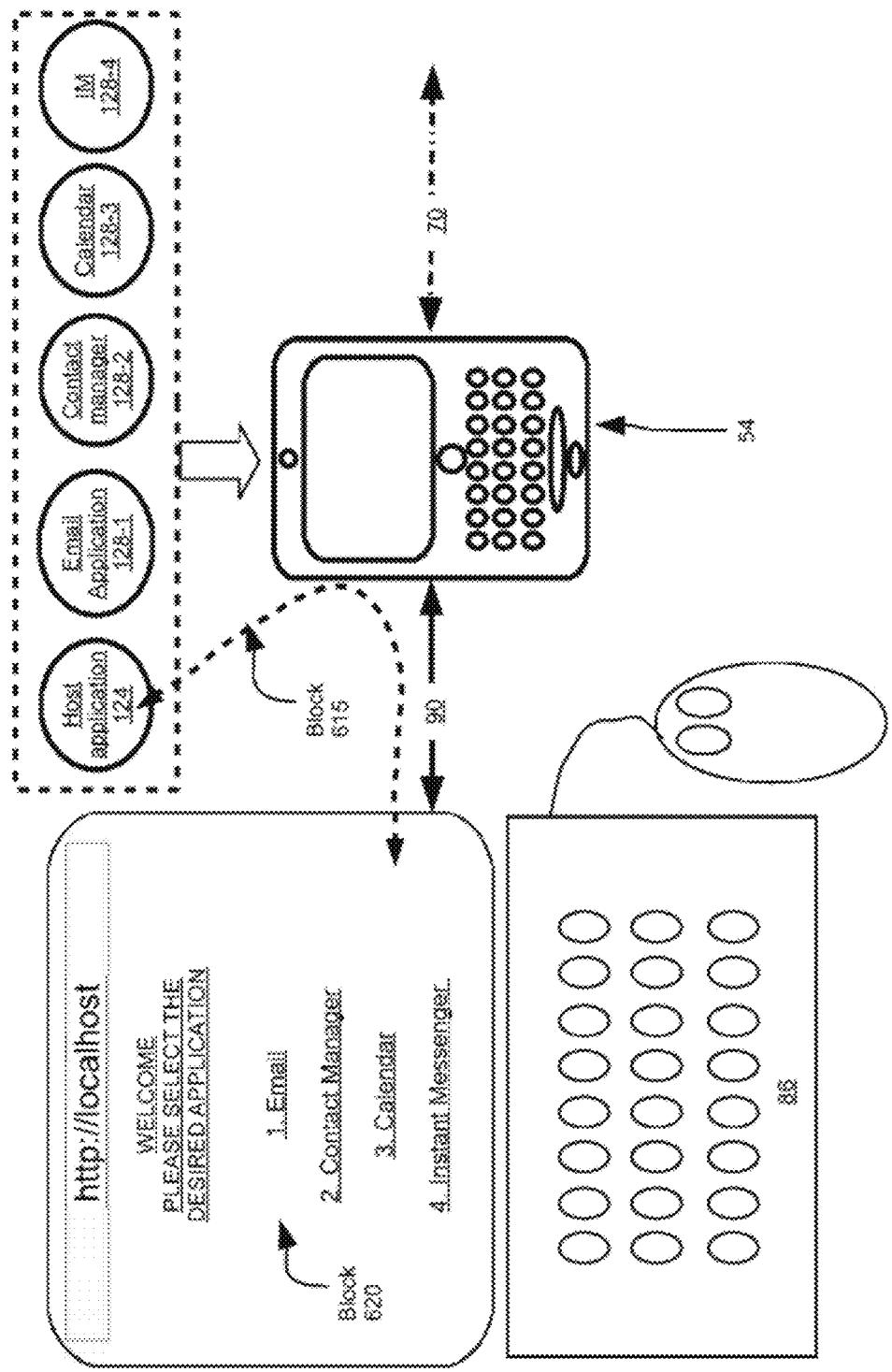
FIG. 9 shows the client machine and device of FIG. 1 in isolation and in greater detail to illustrate an example of performance of certain blocks from the method of FIG. 8.

Block 615 comprises loading a web page from the web service. In system 50, and during the initial performance of block 615, block 615 can comprise loading a webpage in the form of a menu that can be used to select invocation of any one of applications 128. An example of performance of this initial performance of block 615 is shown in FIG. 9, where browser 88 is open on the display of client machine 86, and a URL pointing to the web service 300 of host application 124 is open. Block 620 comprises generating the web page that was loaded at block 615. As can be seen in FIG. 9, host application 124 is serving a menu web page, which offers web-based access to the applications 128 that are available on device 54. Thus, as shown on the display of client machine 86 in FIG. 9, menu item one reads "Email", which is offering access to email application 128-1; menu item two reads "Contact Manager", which is offering access to contact manager application 128-2; menu item three reads "Calendar", which is offering access to contact manager application 128-3; and menu item four reads "Instant Messenger", which is offering access to instant message application 128-4. For simplicity, application 128-*n* is not shown in FIG. 9.

Block 625 comprises sending any local input to the web service. Block 625 is affected through browser 88 which accepts local input from the keyboard or the mouse that is connected to client machine 86. As part of that locally received input, any input that is responsive to forms or links or other input that can be entered into the page generated at block 620 is sent to the web service that originally served the page generated at block 620.

According to the example in FIG. 9, input can be received that selects one of the four menu items being generated on the display of client machine 86. To give a specific example, it can be assumed that menu item one is selected, indicating an instruction to access email application 128-1. Again, such selection can be effected via keyboard input, or by bringing a cursor into focus over the desired selection using a mouse, and then clicking the mouse to effect the selection, or via touch-screen input by touching the desired selection.

Block 630 comprises determining whether an instruction has been received to close the web service. Such an determination can be based on closing browser 88, or it can be based on entry of another URL in the address bar of browser 88, or it can based on any other instruction or event that instructs closing of the web service. A yes determination ends method 600.

Figure 10:
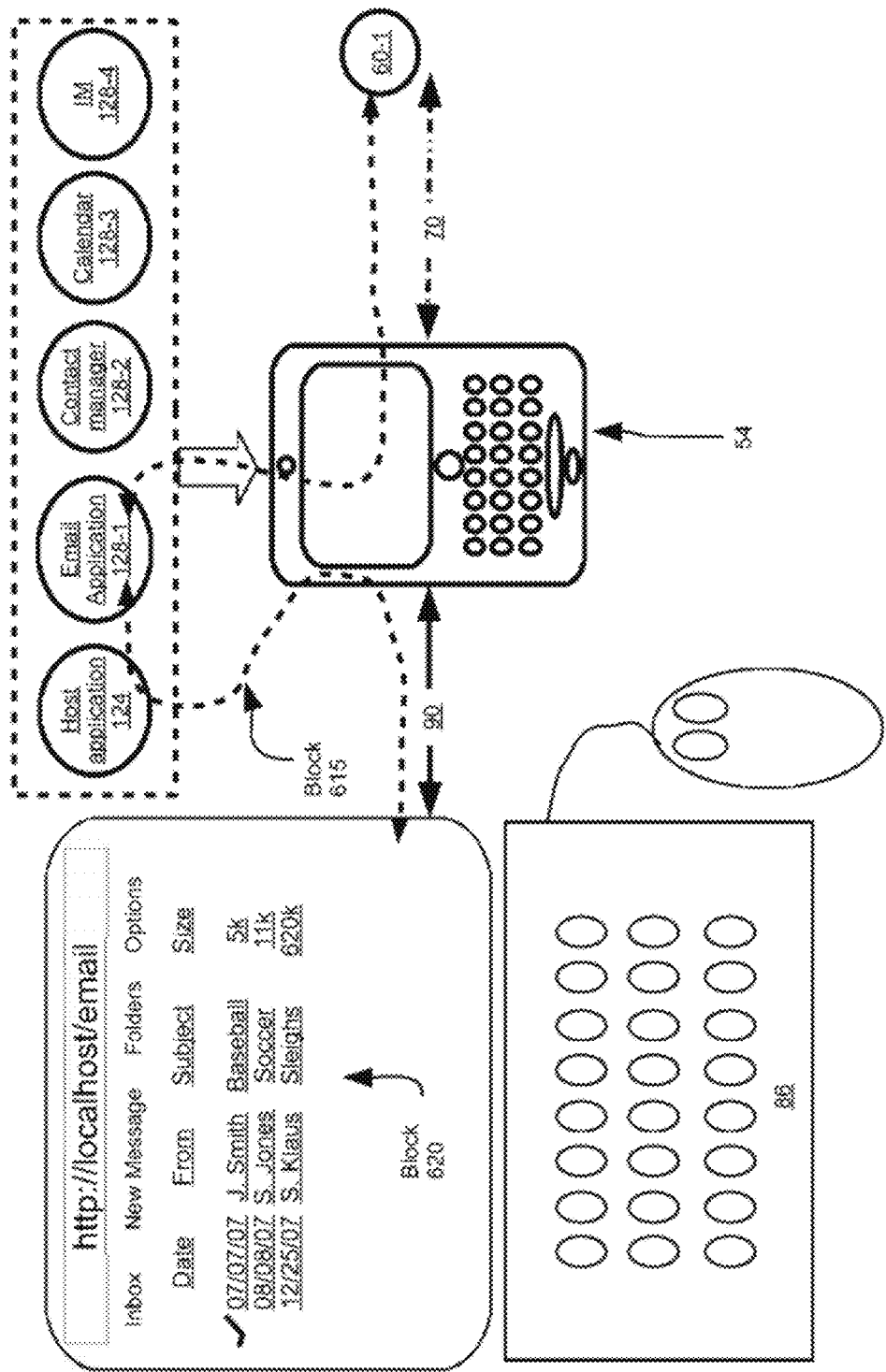
FIG. 10 shows the client machine and device of FIG. 9 to illustrate another example of performance of certain blocks from the method of FIG. 8.

A no determination leads to a return to block 615 where any updates to the web page are loaded. Thereafter, method 600 continues performance as previously described. To give further explanation, and continuing with the example above where the menu selection for email was made, then during this performance of block 615 and block 620, a web page that provides web-access to email application 128-1 will be loaded and generated. This non-limiting example is shown in FIG. 10, where browser application 86 is shown as accessing the address http://localhost/email, which is hosted by host application 124 in order to provide access to email application 128-1. When system 50 is configured using plug-ins 304, then block 615 and block 620 may likewise make appropriate use of plug-in 304-1 from FIG. 5 in order to generate the display shown in FIG. 10.

When the display shown in FIG. 10 is active, then block 525 can comprise receiving any input that is relevant to email application 128-1, For example, such input may comprise selecting "New Message", to thereby cause generation of a dialogue box on the display of client machine 86 which can be used to compose a new email message. In this example, a subsequent cycle through block 615 and block 620 would result in generation of such a dialogue box for composition of a new email message. Note that such generation is effected by host application 124 creating a web page with such a dialogue box, based on host application 124 interacting with email application 128-1, again making use of plug-in 304-1 from FIG. 5 when such a plug-in is employed. In variations, code to generate and display such a dialogue box may have been included in or referenced by the original web page, so a new web page may not need to be loaded in order for such a dialogue box to appear on the display.

In general, those skilled in the art will now appreciate that the data generated on the display of client machine 86 is under the control of device 54 and that client machine 86 is effectively a web-client while device 54 acts as a web-server. Furthermore, device 54 also uses link 70 to access the appropriate server 58 and application 60, as part of determining what data to display on the display of client machine 86. Again, in the example of email, email application 128-1 accesses application 60-1 on server 58-1 in order to send new emails generated using client machine 86 and by the same token, email application 128-1 accesses application 60-1 in order to receive new emails, which are in turn generated on the display of client machine 86. Any other functions normally associated with email application 128-1 are likewise reflected on the display of client machine 86 and appropriate access to server 58-1 is effected accordingly. In addition to static web pages, browser 88 may be configured to receive code (e.g. JavaScript code) from host application 124. While executing this code, browser 88 may, from time to time, (e.g. possibly in response to user input or some other condition), request additional resources from host application 124 in order to update the page currently on the display without loading an entirely new page.

In order to configure browser 88 to respond to changes that occur on device 54, or on server 60, an "open-get" or equivalent programming function is employed so that browser 88 will automatically receive and respond to such changes. For example, assume that a new email message arrives on server 58-1, and that same new email message automatically arrives on device 54. The "open-get" function running on browser 88 will result in browser 88 also ascertaining the arrival of the new email message and result in the display of client machine 86 being updated accordingly to reflect the arrival of the new email message.

Figure 11:
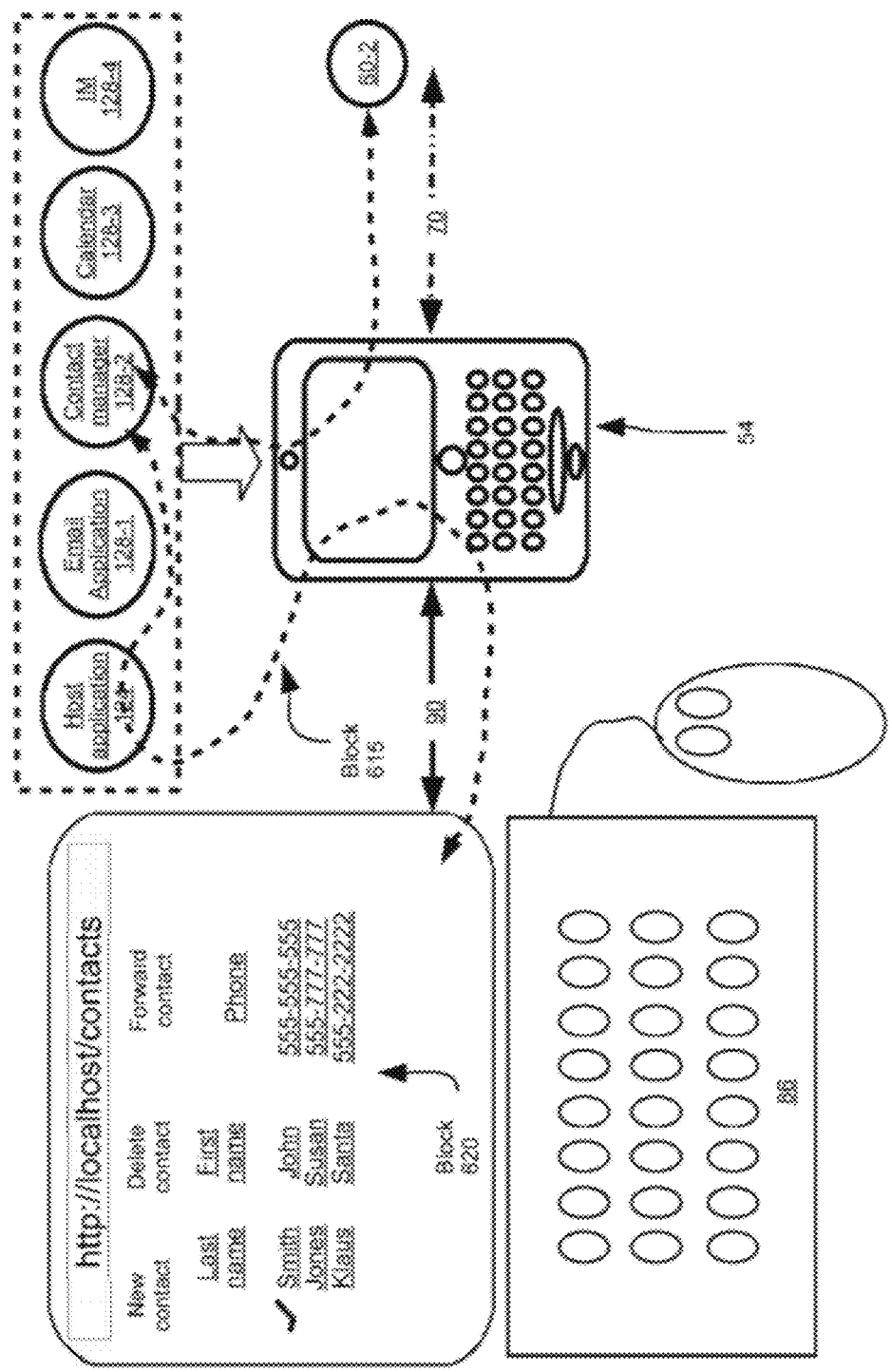
FIG. 11 shows the client machine and device of FIG. 9 to illustrate another example of performance of certain blocks from the method of FIG. 8.

To help further illustrate the present specification, FIG. 11 shows a non-limiting example of the result of selecting contact manager application 128-2. In FIG. 11, the URL http://localhost/contacts is active and accordingly the web service 300 of host application 124 is accessing contact manager 128-2 so that input relative to contact manager application 128-2 can be received via client machine 86, and likewise, the display of client machine 86 can be controlled to display content relative to contact manager application 124. Again, changes to the contact database can be made on client machine 86, or they can be made on device 54. Such changes can then be propagated to server 60-2 in the usual manner.

Those skilled in the art will now recognize how the foregoing can extend to calendar application 128-3, instant messenger application 128-4 and other applications 128-n.

Various advantages will now be apparent. For example, it is common that communications between device 54 and servers 58 may be effected via encrypted links. Accordingly, when link 90 is active, a full browsing experience, complete with full size display and full size keyboard, can be used to interact with various applications on device 54 but such interactions will be encrypted and secure. Furthermore, in certain situations link 94 may not be available, or of limited use, due to security restrictions, usage fees, or of low bandwidth and accordingly accessing data on servers 58 from client machine 96 via link 94 may not be possible or may be impractical. Nonetheless, it may be desired to use client machine 86 for such interactions, rather than device 54, due to the availability of the full keyboard, mouse, and regular display that is available on client machine 86. Accordingly, the present specification may be most useful when device 54 is near enough to a given client machine 86 in order to establish link 90. Such client machines 86 can be provided in airport lounges, hotel rooms, Internet cafes and other locations. Accordingly, for at least these reasons, this specification can be used to provide access to various applications from such client machines 86 in a novel, inventive and useful manner. It should also be noted that client machine 86 may have different configurations, and could include, for example, a tablet computer.

Variations, subsets, enhancements, and combinations of the foregoing are contemplated. For example, none of the screen shots shown in FIG. 9, FIG. 10, or FIG. 11 should be construed as being limiting as to exactly how data is generated on the display of client machine 86.

Furthermore, in relation to proxy application 308 in FIG. 7, it may be unlikely that publicly available client machines 86 will have proxy application 308 pre-installed, so as noted proxy application 308 may be stored in non-volatile storage 104 on client device 54. Further, it should be noted that non-volatile storage 104, itself, can be implemented as a removable storage media such as an SD card. Using a USB connection that proxy application 308 may be downloaded from the SD card to the client machine 86. Device 54 may also be configured so that it includes an auto-executable file which immediately executes on client machine 86 upon connection to client machine 86, and automatically copies proxy application 308 to the client machine 86. (Alternatively, device 54 can be configured so this installation is performed manually). After proxy application 308 has started, link 90 may be implemented via the USB connection or Bluetooth pairing or by other means. In the case of Bluetooth pairing, the pairing step with client machine 86 could happen in a number of ways. For example, a scan for Bluetooth devices may be initiated from either device 54 or client machine 86 or both in the usual way. Alternatively, as part of proxy application 308, the client machine 86 may be configured to display a barcode that can be scanned using optical capture unit 176. The barcode data may comprise configuration information usable by device 54 to establish pairing with client machine 86.

When a "yes" decision is reached at block 630, client machine 86 may be configured to clear its browser cache to ensure that private data has been cleared from the client machine's 86 memory. The "yes" determination at block 630 may be reached a number of ways: device 54 may be manually logged off from client machine 86: link 90 may be terminated by unplugging a USB cable used to establish link 90; link 90 may be Bluetooth connection. An inactivity timer may be used to reach the "yes" determination at bock 630.

Alternatively, client machine 86 may operate in a no-cache mode when connected to device 54. In this mode, performance may be somewhat degraded since browser 86 may download content more often.

As noted above, device 54 runs a host application 124 that may be configured to listen to a real time communication channel, such an instant messaging conversation via instant message application 128-4. JavaScript may be executing on browser 88, such JavaScript having been provided by host application 124. This JavaScript maintains an open connection with the host application 124. When an event occurs in application 128-4, it is returned to the JavaScript so that corresponding changes occur on the display of client machine 86 under the control over browser 88. If an instant message reply is sent from the browser 88, then a separate parallel connection is opened and the commands are sent to host application 124 which then injects them into the ongoing conversation within instant message application 128-4.

In general, it can be noted that there are many applications 128 (with corresponding data sources and networking applications 60) on devices like device 54, including without limitation email, contacts, calendar, etc. Using this specification, each application 60 and its data may be rendered using browser 88 in a customized manner. Also, newly-installed and newly-created applications 128 may be readily added as available through browser 88 by creating a new application plug-in 304 for each new application 128. Host application 124 is configured to allow for ongoing registrations of new plug-ins 304. In effect, device 54 provides an application programming interface (API) associated with host application 124 that allows any application 128 running on the device 54 to register as a data source. Each application 128 can be assigned its own URL prefix and a handler class that implements a particular interface. All hypertext transfer protocol (HTTP) requests from client machine 86 for URLs with that prefix may be given to the handler class to be processed. The HTTP handler may respond to each request in any way that it sees fit, so it is in control of the data rendering. Because registration of applications 128 with host application may be dynamic, it is not needed to compile host application 124 to be limited to only those applications 128 installed at the same time as host application 124 is installed. Newly-installed applications can register at which point they will dynamically appear as being available through browser 88. Host application 124 can also dynamically enumerate all of the registered applications 128 at the time of creating a menu screen such as the menu screen shown in FIG. 9.

Figure 12:
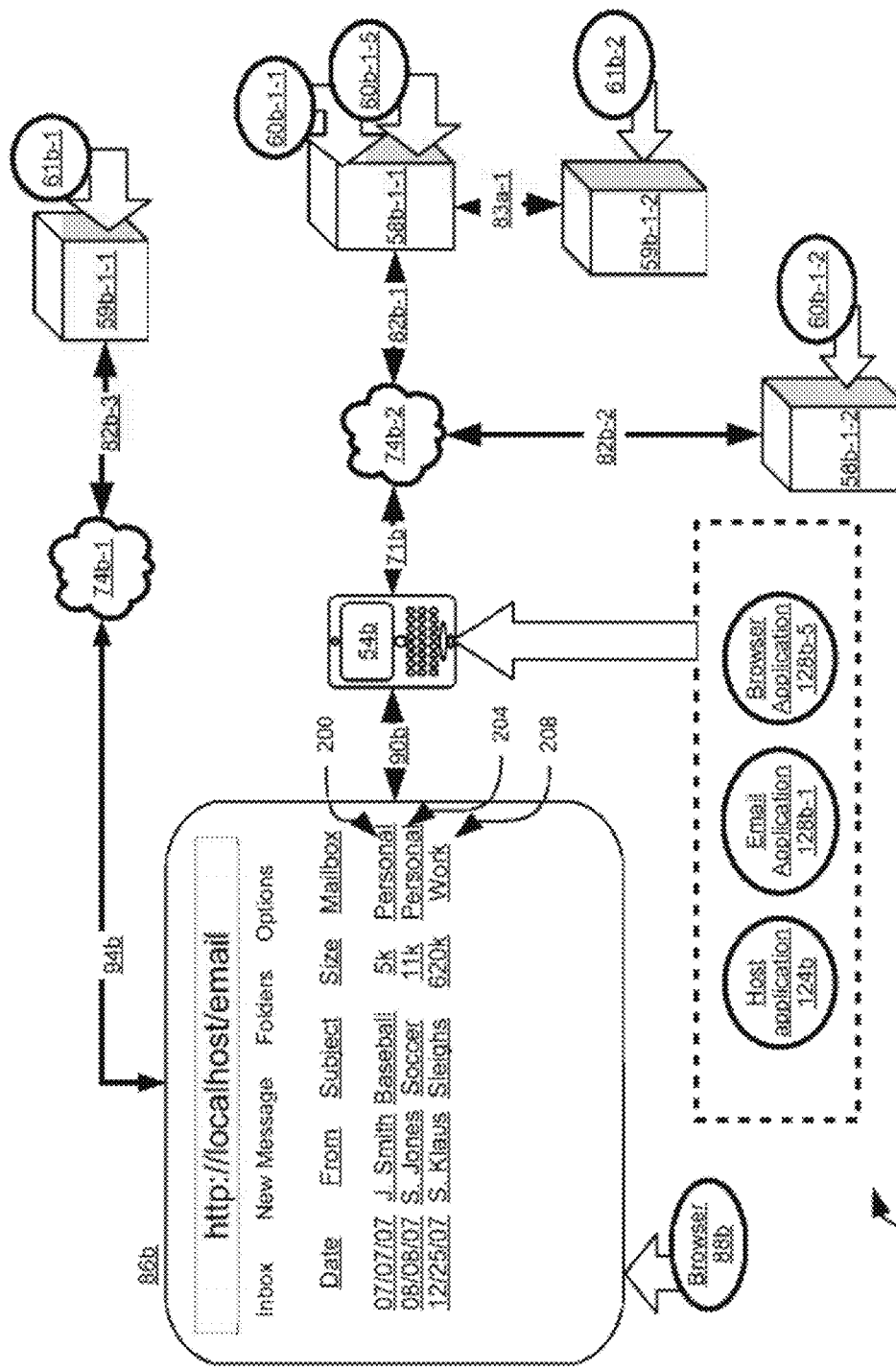
FIG. 12 is a schematic representation of a system for accessing one or more applications and content across a plurality of computers.

Referring now to FIG. 12, a system for accessing one or more applications and content across a plurality of computers is indicated generally at 50b. System 50b is a variation on system 50 and therefore like elements bears like references, except followed by the suffix "b".

Of note is that in system 50b, link 71b replaces link 70, base station 66-1, and link 78-1 from system 50. Note that link 71b may be implemented as link 70, base station 66-1, and link 78-1, or in other ways, as will now occur to those skilled in the art having regard to the discussions about the various types of links discussed herein and the state of the art. (By the same token, such other ways of implementing link 71b can also replace link 70, base station 66-1, and link 78-1 in system 50).

Also of note in system 50b, is that device 54b is provided with a browser service 128b-5 which can be used, in certain circumstances, to fetch remote resources that are embedded in email messages which are processed by email application 128b-1. Further details about browser service 128b-5 will be discussed further below.

Also of note in system 50b is that client machine 86b is implemented, for illustrative purposes, as a tablet computer, thereby rendering the use of a separate keyboard and mouse as optional, instead offering the option of relying on a touch screen interface on the display of client machine 86b for keyboard and pointing functions. However, it is to be understood that client machine 86b could be implemented as a desktop computer or laptop computer or the like.

Also of note in FIG. 12, an email inbox is generated on the display of client machine 86b by host application 124b and email application 128b-1, using the general methodology discussed above in relation to system 50 and FIG. 10. In FIG. 12, each email in the inbox is provided with reference characters, namely email 200, email 204, and email 208. In system 50b, a "mailbox" column is also provided which shows whether a given email in the inbox originated from a "work" or "personal" email account. Such a mailbox column contemplates that a plurality of different email accounts having different names can be accessed via email application 128b-1. The multiplicity of email box accounts is discussed further below.

System 50b also comprises a different set of network connections that system 50, although again the network connections shown in system 50b could be applied to system 50.

In system 50b, network 74 is implemented as a first network 74b-1 and a second network 74b-2. In practice, the separation between first network 74b and second network 74b may be virtual and not physical, in that device 54b may be configured with a security policy, or other security infrastructure, which only permits device 54b to communicate with servers 58b, while client machine 86b is only configured to communicate with server 59b-1-1. In one possible specific, but non-limiting example of an implementation of system 50b, link 94b may be a home or public IEEE 802.11 network (a.k.a. a WiFi hotspot) and network 74b-1 thus represents the public Internet, and server 59b-1-1 represents a server on the public Internet that hosts content 61b-1 that is generally available over the public Internet. The nature of content 61b-1 is not particularly limited, and can comprise, for example, web pages or images. Also in this specific, non-limiting example, network 74b-2 represents a private network (e.g. a virtual private network) that runs over the Internet, and server 58b-1-1 represents a corporate server (sometimes referred to as an enterprise server) on this private network that provides access to a "work" email account, while server 58b-1-2 represents a personal email server that hosts a personal email account that is nonetheless only accessible via device 54b. System 50b also comprises an enterprise content server 59b-1-2 that connects to enterprise server 58b-1-1 via a private link 83a-1. Accordingly, enterprise content server 59b-1-2 represents a server that is only accessible via corporate server 58b-1-1 and hosts content 61b-2 that is only available via corporate server 58b-1-1. However, the nature of content 61b-2 is not particularly limited, and can comprise, for example, web pages or images, and is generally analogous to the same type of content as content 61b-1.

Those skilled in the art will now recognize that those email items labeled as "Work" (i.e. email 208) in FIG. 12 represent emails that originated from server 58b-1-1, while mail items labeled as "Personal" (i.e. email 200 and email 204) in FIG. 12 represent emails that originated from server 58b-1-2. Thus, server side application 60b-1-1 represents a corporate email account that manages "Work" email messages for device 54b via email application 128b-1, while server side application 60b-1-2 represents a personal email account that manages "Personal" email messages for device 54b via email application 128b-1.

Corporate server 58b-1-1 also hosts a server side browser service 60b-1-5 that, in certain circumstances, may be accessed via browser service 128b-5, as will be discussed further below.

Figure 13:
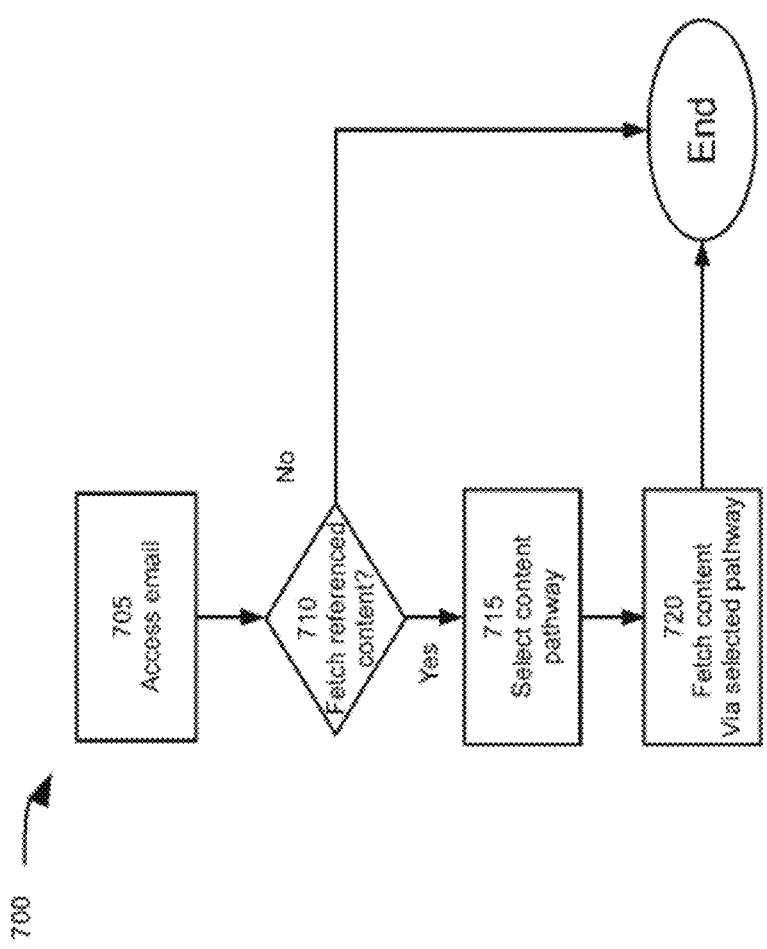
FIG. 13 shows a method of accessing one or more applications and content across a plurality of computers.

In general, system 50b can be used to display emails on client machine 86b via device 54b, including the fetching and displaying of content that may be referenced in those emails, even where the content is maintained on a content server that is different from the email server, and even where a plurality of email servers and content servers are provided. Method 700, depicted in the form of a flowchart in FIG. 13, provides a non-limiting example of how this can be effected. Method 700 may execute as part of performance of various blocks of method 600.

Block 705 comprises accessing an email. The term "access" should not be construed in a limiting sense. For example, may comprise the opening of an email on client machine 86b via browser 88b, working in conjunction with host application 124b, and email application 128b-1.

Figure 14:
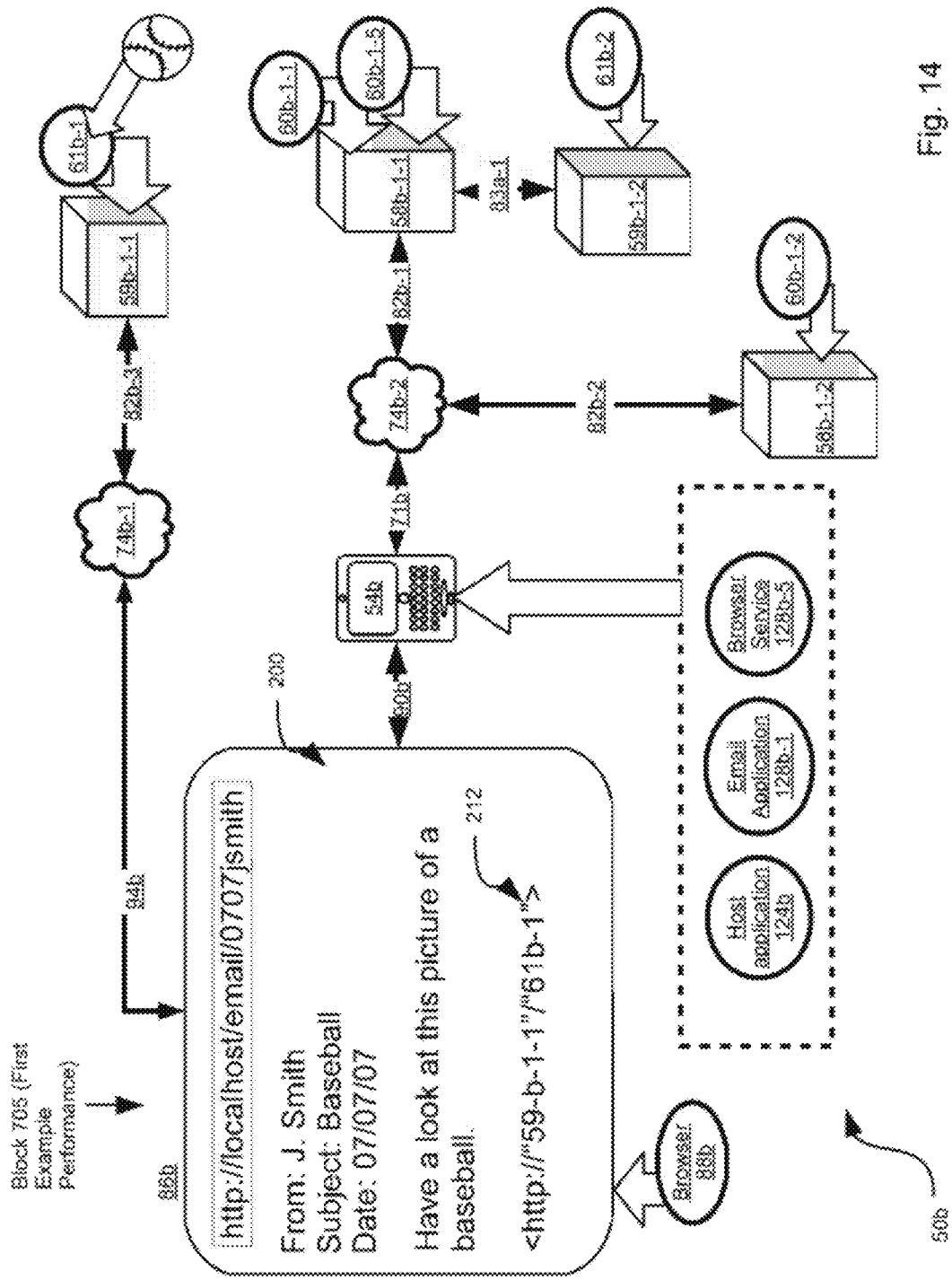
FIG. 14 shows system of FIG. 12 to illustrate example of performance of certain blocks from the method of FIG. 13.

An example performance of block 705 is now shown in FIG. 14. Email 200 is shown in FIG. 14 as open on the display of client machine 86b. As shown in FIG. 14, the body of email 200 includes text and a uniform resource locator (URL) 212 that points to http://"59-b-1-1"/"61b-1." URL 212 is more generally referred to herein as a content reference, as there are other ways that content referencing may be implemented other than a URL. It is thus contemplated that the email that is accessed at block 705 comprises a content reference, as discussed further below.

The exact form of URL 212 as shown in FIG. 14 is for illustrative purposes only, and does not necessarily reflect the actual form that would appear within a particular email message in a practical implementation. Indeed, the actual form of URL 212 may include a reference (not shown) to a proxy such as proxy 308 shown in FIG. 7, so that proxy 308 is used as part of the actual fetching process. Indeed, it is contemplated that in certain embodiments proxy 308, or a variant thereof, may be incorporated into system 50b which is configured to implement at least part of method 700 in system 50b. Alternatively, the actual form of URL 212 may include a reference (not shown) to a proxy server (not shown) that is associated with host application 124b or other application on device 54b, that is configured to implement at least part of method 700 in system 50b. In a present embodiment, the functionality of such a proxy server is presumed to be incorporated directly into host application 124b.

In addition, URL 212 also includes an address (shown) that points to content that is available over network 74b-1. In this example, URL 212 points to content 61b-1 which in this specific example is a picture of a baseball. Again, the exact form of this portion of URL generally corresponds to known Internet protocol (IP) addressing schemes, and thus the form shown in FIG. 14 is illustrative only.

At this point it bears repeating the fact that email 200 originated from server 58b-1-2 and was received via network 74b-2, but that email 200 ultimately includes a content reference that points to content which is accessible via network 74b-1. It can also be noted that the original version of email 200 as received at device 54b, in many implementations, would not have included the proxy server reference in URL 212, and thus it is contemplated that URL 212 was modified from its original form, in order to include the proxy server reference. Such a modification of URL 212, to include the proxy server reference, may be effected by device 54b, or by server 58b-1-2, by an intermediation server (not shown), or by client machine 86b itself.

Block 710 comprises a determination as to whether to fetch the content that is referenced in the email accessed at block 705. A "no" determination ends method 700. A "yes" determination leads to block 715. The means by which a "yes" determination is made is not particularly limited, and can include a setting within device 54b or browser 88b that prescribes the automatic fetching of content embedded into an email message. A "yes" determination may also be made at block 710 manually, whereby a pointing device on client machine 86b is used to "point and click" on URL 200 to reflect a manual instruction to fetch the content associated with URL 200. A "no" determination may be made at block 710 by, for example, an automatic classification operation that flags email 200 as potentially comprising spam, or a phishing attack, or otherwise flagging that URL 200 comprises malicious code.

When a "yes" determination is made at block 710, then block 715 is reached. Block 715 comprises selecting a content pathway through which to fetch the referenced content. The means by which block 715 is effected is also not particularly limited, and can be based on a plurality of factors including the actual topology of the various network connections in system 50b. Thus, the actual selected content pathway may vary if the network connections in system 50b vary. It is presently contemplated that, in one example implementation, for a network topology like that shown in system 50b, then the selected content pathway will be automatically selected based on the server 58b-1 that originated the email being accessed at block 705. Thus, since system 50b comprises two servers that originate emails, (namely, server 58b-1-1 and server 58b-1-2), then two content pathways are contemplated. The first content pathway corresponds to work emails (e.g. email 208) received from server 58b-1-1, and that first pathway comprises link 90b, link 71a, network 74b-2, link 82b-1 and link 83a-1. The second content pathway corresponds to personal emails (e.g. email 200 and email 204) received from server 58b-1-2, and that second pathway comprises link 94b and link 82b-3. According to the foregoing example, the content pathway selected at block 715 will be the second content pathway comprising link 94b.

Figure 15:
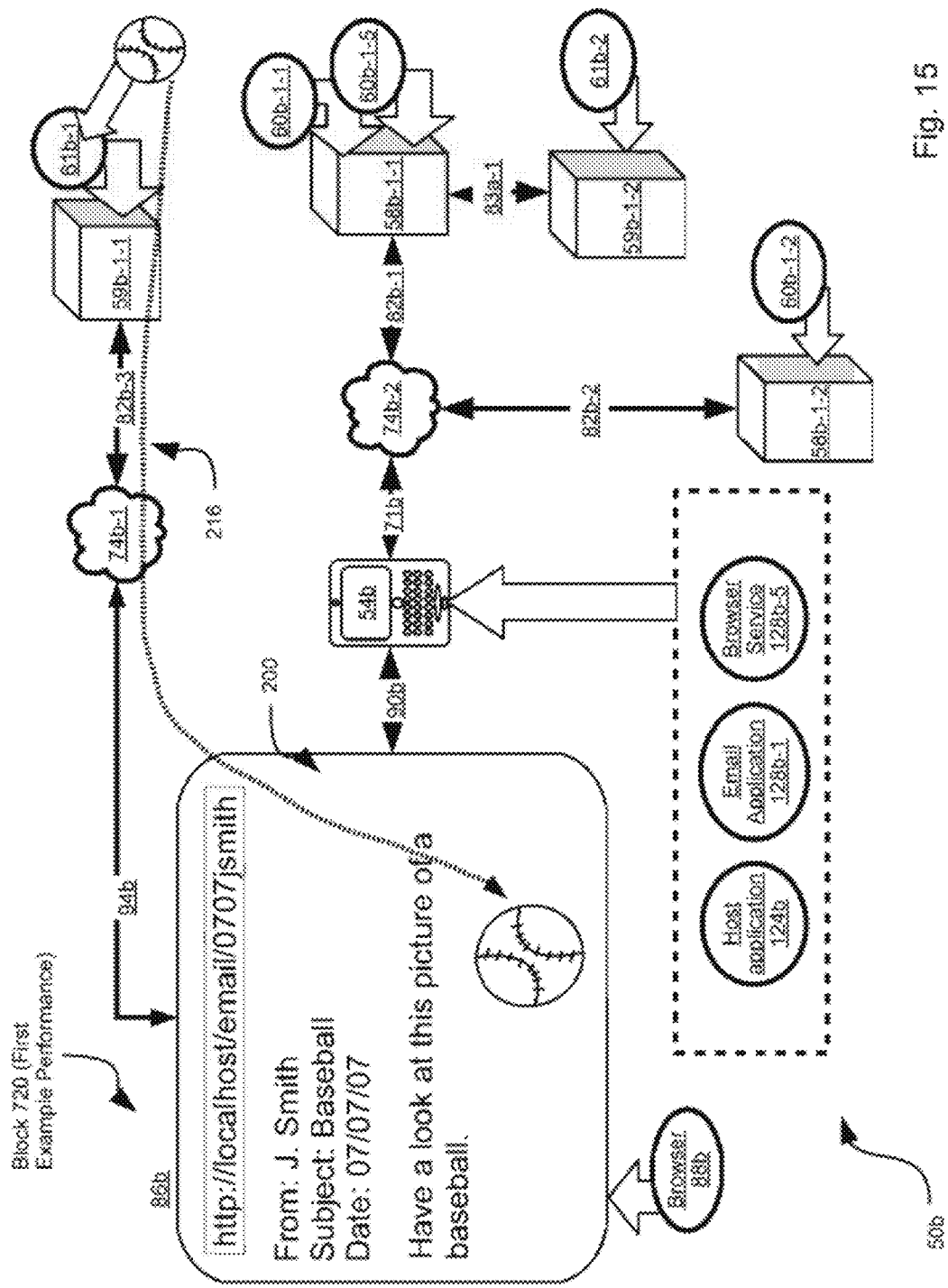
FIG. 15 shows system of FIG. 12 to illustrate example of performance of certain blocks from the method of FIG. 13.

Block 720 comprises fetching the content via the pathway selected at block 715. Performance of block 720, consistent with the example discussed above, is shown in FIG. 15. In FIG. 15, the image of a baseball is shown as being fetched via pathway 216 and ultimately generated on the display of client machine 86b and replacing the display of URL 200. At this point method 700 ends.

Figure 16:
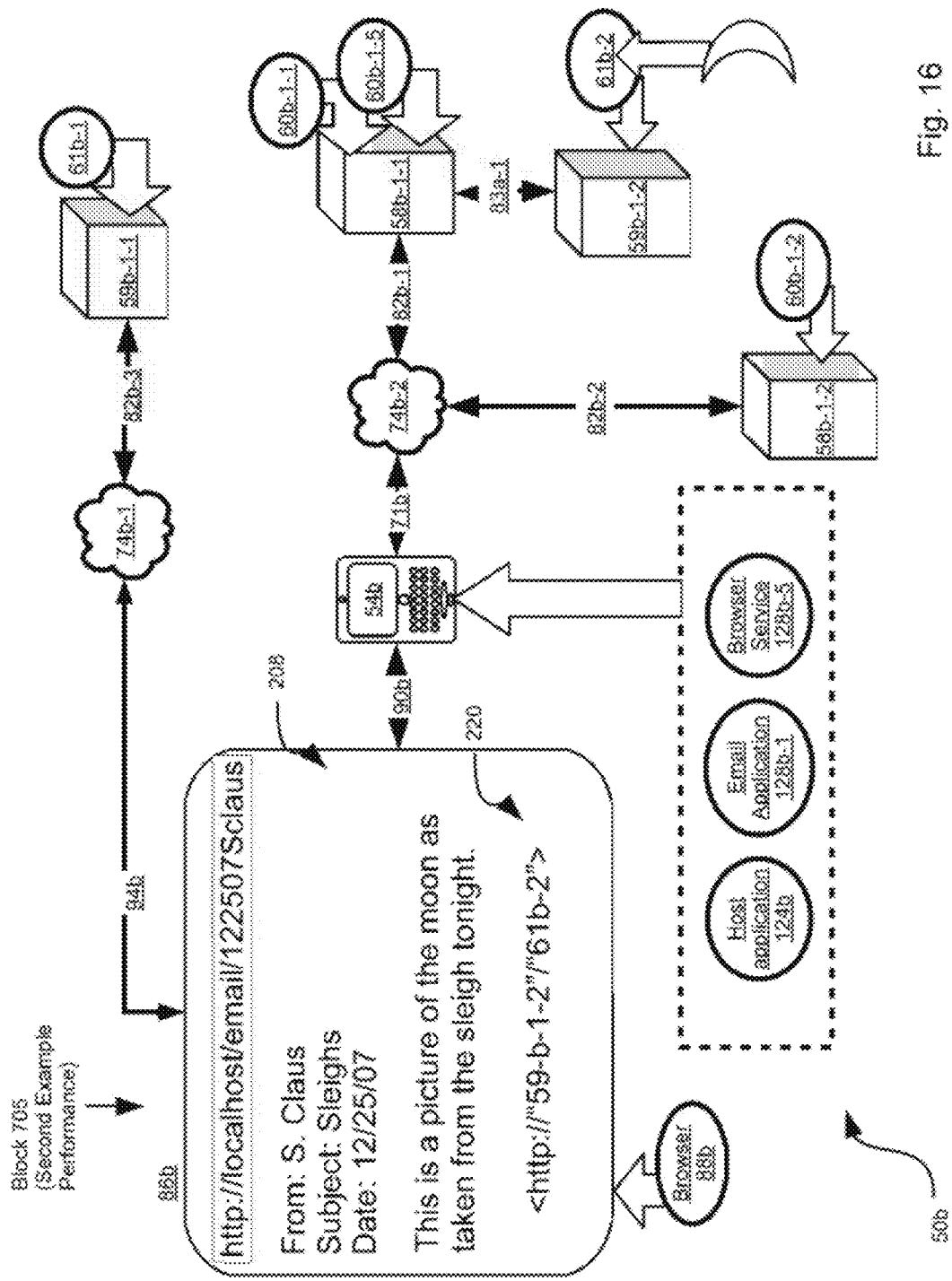
FIG. 16 shows system of FIG. 12 to illustrate example of performance of certain blocks from the method of FIG. 13.
Figure 17:
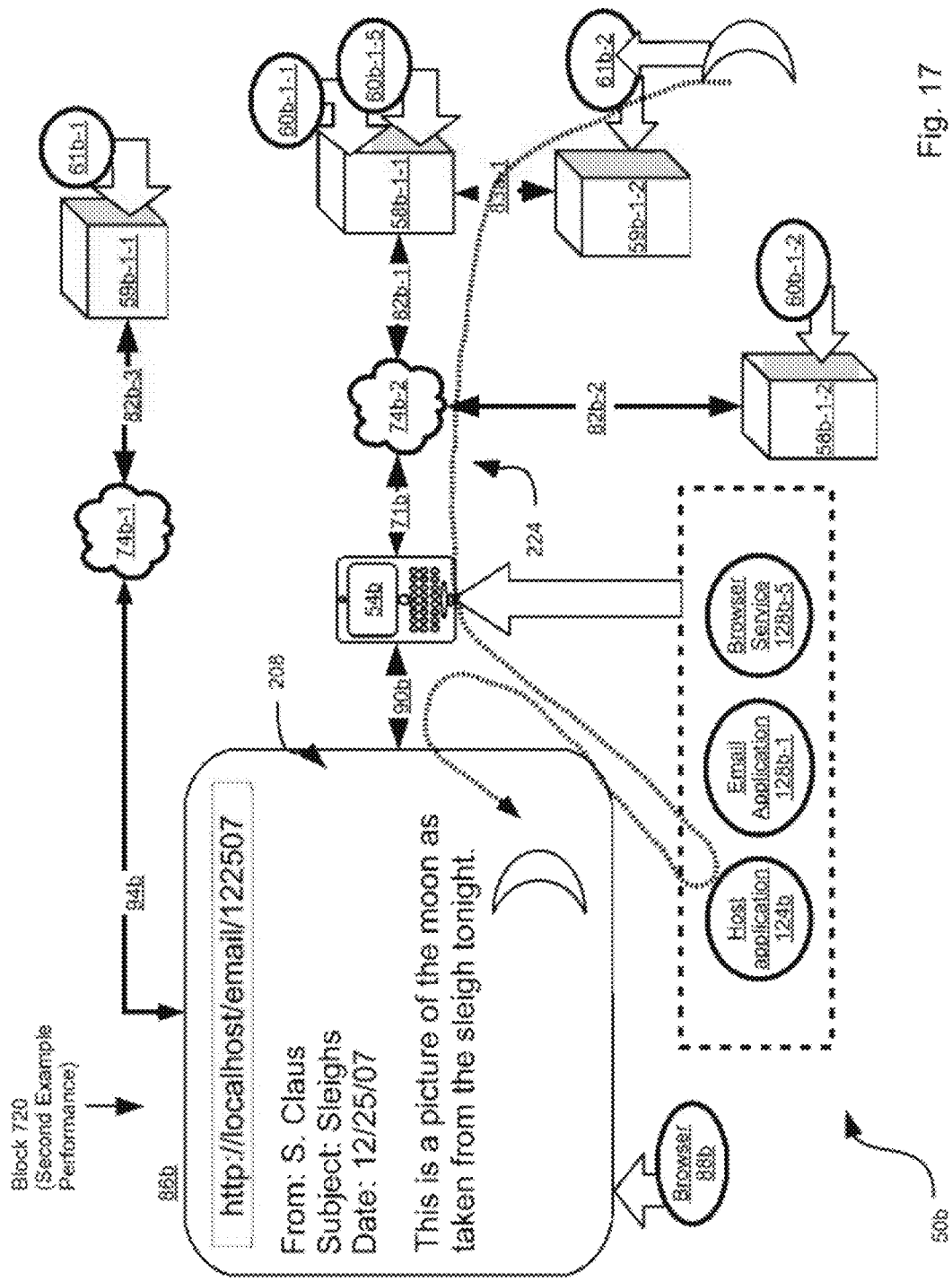
FIG. 17 shows system of FIG. 12 to illustrate example of performance of certain blocks from the method of FIG. 13.

A second example performance of method 700, in relation to email 208, is shown in FIG. 16 and FIG. 17. FIG. 16 shows the accessing of email 208 at block 705. Email 208 includes a URL 220 that points to content 61b-2 stored on server 59b-1-2. Since content 61b-2 resides behind server 82b-1, such content is not accessible via link 94b. the selection of the pathway at block 715 is based on the fact that the email 208 originated from server 58b-1-1, and therefore the selected pathway comprises link 90b, link 71a, network 74b-2, link 82b-1 and link 83a-1. Example performance of block 720 is shown in FIG. 17, as an image of a moon, stored as content 61 b-2 is fetched, via pathway 224, and generated on the display of client machine 86b in in the place of URL 220.

Figure 18:
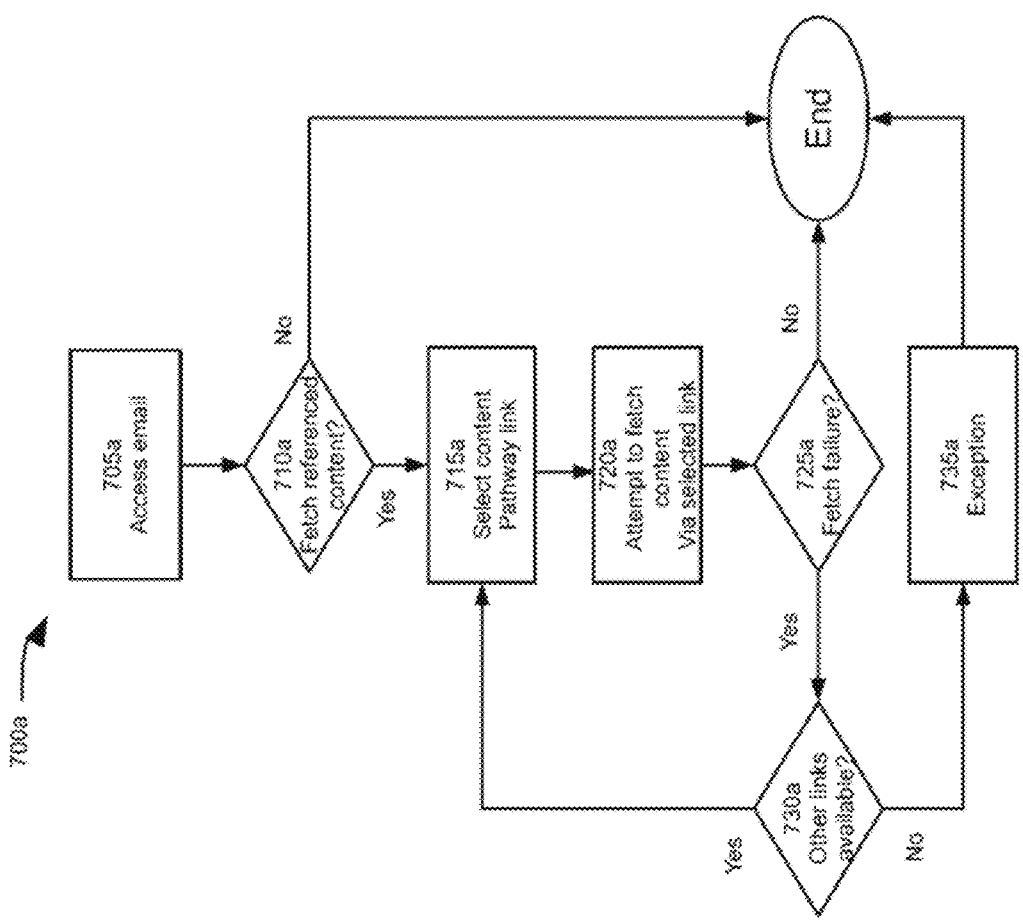
FIG. 18 shows another method of accessing one or more applications and content across a plurality of computers.

The foregoing examples in FIG. 14, FIG. 15, FIG. 16, and FIG. 17 contemplate a first implementation where the selection of the pathway is based on the source of the email. However, other implementations are also contemplated. FIG. 18 shows method 700a, which is a variation on method 700. Of note is that method 700a includes block 720a whereby an attempt is made to fetch content via a selected link, much in the way that the actual fetching is done at block 720 in method 700. However, per block 725a, method 700a contemplates a possibility of a failure to complete the fetch. Block 730a contemplates determining whether additional pathways are available and the looping back to block 715a to try such other pathways, or the generation of an exception at block 735a if no fetch is possible.

Figure 19:
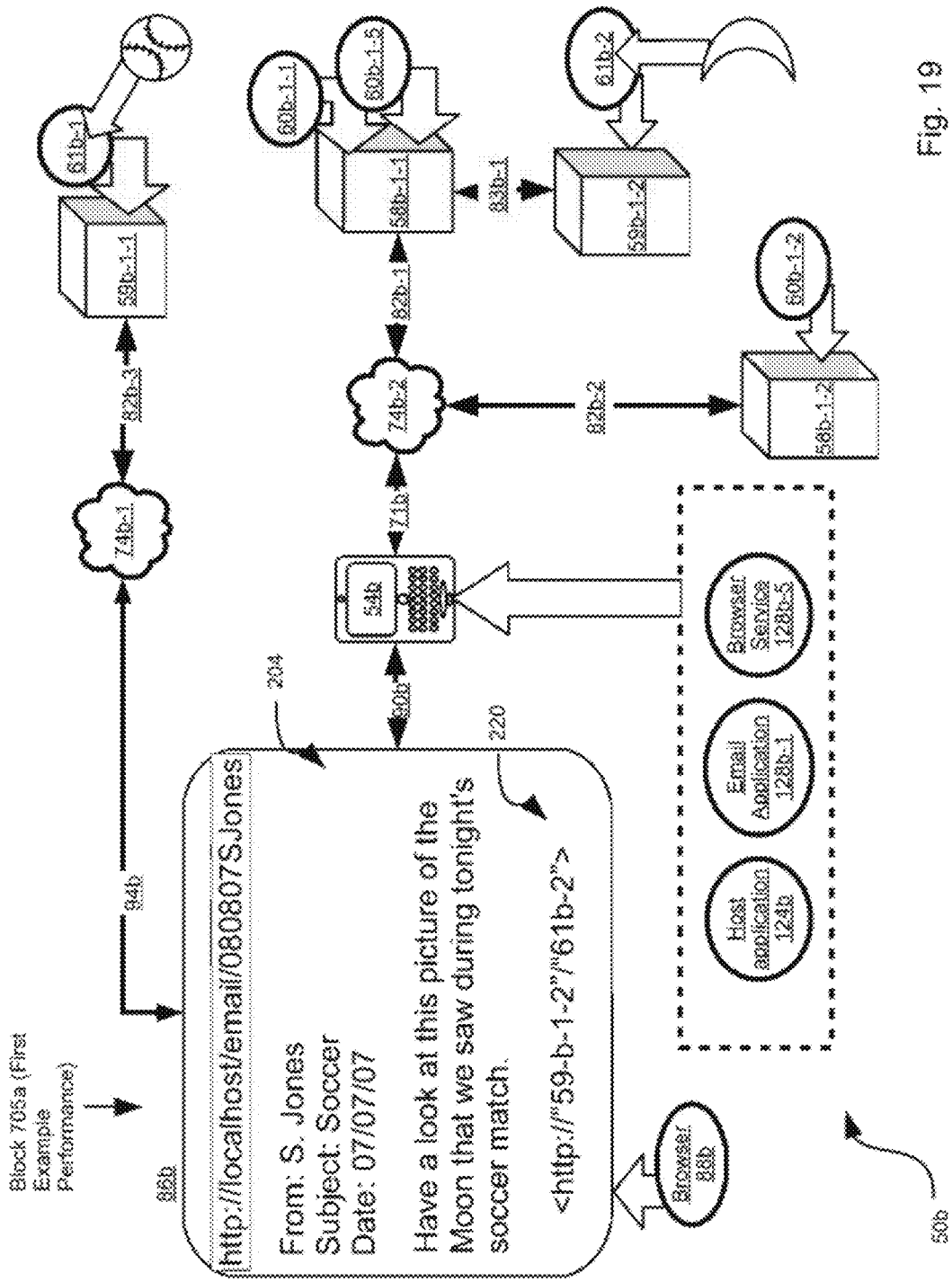
FIG. 19 shows system of FIG. 18 to illustrate example of performance of certain blocks from the method of FIG. 13.

An initial failure could occur at block 725a, according to the following non-limiting example, in FIG. 19. FIG. 19 shows URL 220 within personal email 204. However, URL 220 points to content on server 59b-1-2, even though email 204 originated from personal email server 58b-1-2. During an initial pass through block 715a and block 720a, a fetch over link 94b will fail due to the fact that server 59b-1-2 is not accessible via link 94b. Accordingly, during a subsequent cycle through block 730a and block 715a, the pathway comprising link 90b, link 71a, network 74b-2, link 82b-1, and link 83a-1 will be selected so that the image of the moon can ultimately be fetched.

Figure 20:
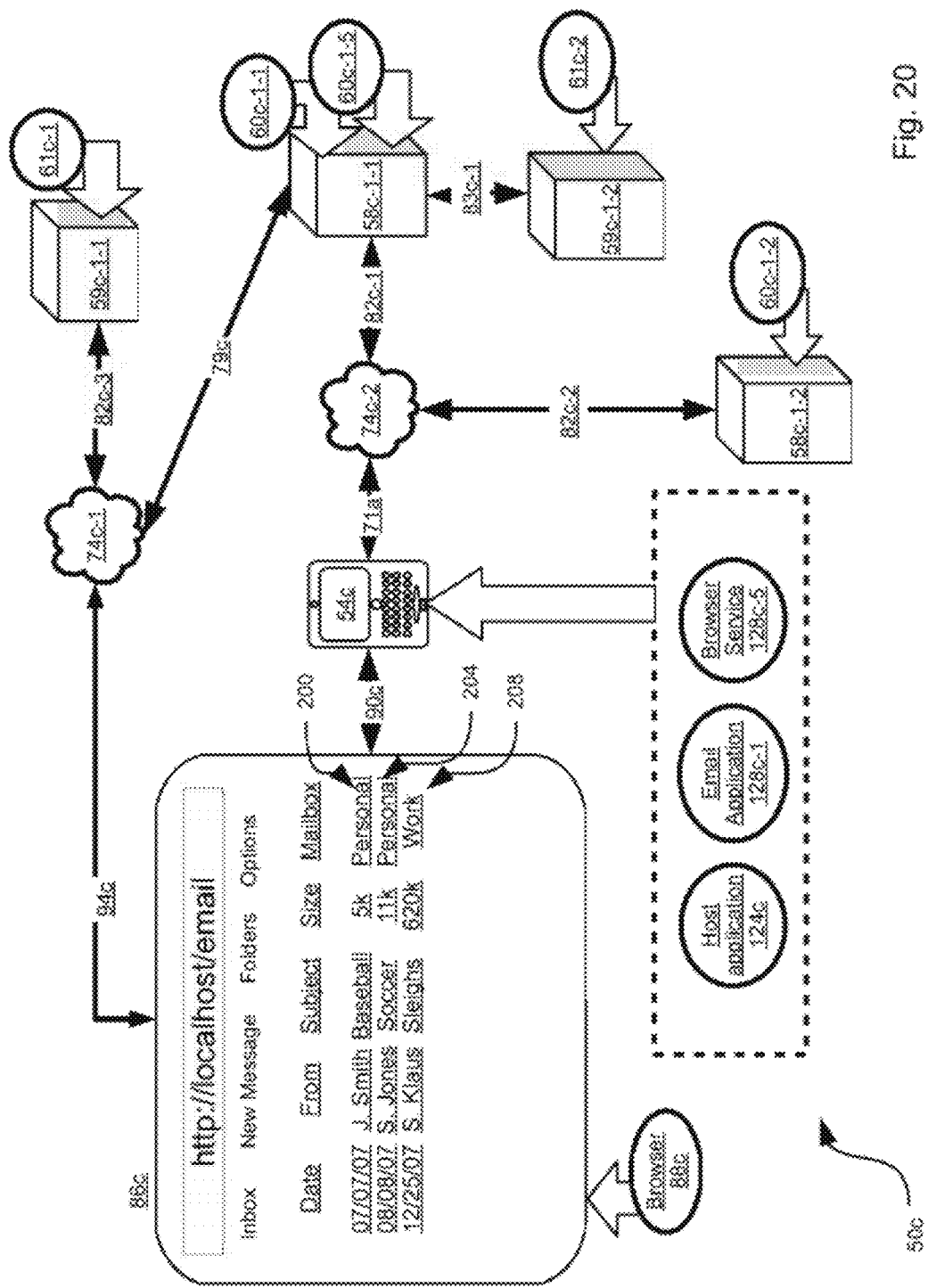
FIG. 20 shows a variation on the system of FIG. 12.

It is to be reiterated that the selection criteria at block 715, or at block 715a, is not particularly limited. Furthermore, such selection criteria may change depend on the network configuration or security policies of device 54b or combinations thereof. For example, FIG. 20 contemplates system 50c, which is a variation on system 50b. System 50c bears like references for like elements, except the suffix "c" is used in place of the suffix "b". System 50c also comprises a link 79c which connects server 58b-1-1 to network 74c-1. (Note that in system 50c, client machine 86c may also optionally be afforded direct connection to server 58c-1-1 via link 94c, although typically with the proviso that a proper virtual private network must first be established over link 94c and link 79c).

Because of link 79c, at least two different pathways are available from client machine 86c to network 74c-1, in order to ultimately reach content 61c-1. Those two pathways are: 1) directly via link 94c or 2) indirectly via link 90b, link 71a, link 82b-1 and link 79c. Accordingly, the selection criteria at block 715 may favor a particular pathway based on, for example, levels of available encryption, bandwidth, pricing, processing burden or speed of the various pathways. The selection criteria at block 715a may initially default to one of the paths, and then try the second path in the event of a failure over the first pathway.

It can be noted that when a pathway comprising server 58c-1-1 is chosen, then system 50c may be configured to make use of browser service 128c-5 in conjunction with browser service 60c-1-5 to access different content 61c, such access being used in order to enforce security policies. However, where there are no security restrictions, then the pathway comprising link 94c may be favored as it reduces processing burdens on device 54c and server 58c-1-1. Where security restrictions are in place, then the pathway comprising server 58c-1-1 may be required.

Other possible selection criteria at block 715 or block 715a comprises selecting a pathway based on a sender of a particular email. For example, emails from "S. Claus" could be configured to default to one pathway, while emails from "J. Smith" could be configured to default to another pathway. Other possible selection criteria at block 715a comprises selecting a pathway based on other characteristics of a particular email, such as a past successful pathway. According to this selection criteria, fetch failures at block 725a are used to vary the default pathway selection at block 715a, so that during subsequent performances of method 700a a correct pathway is initially selected.

Figure 21:
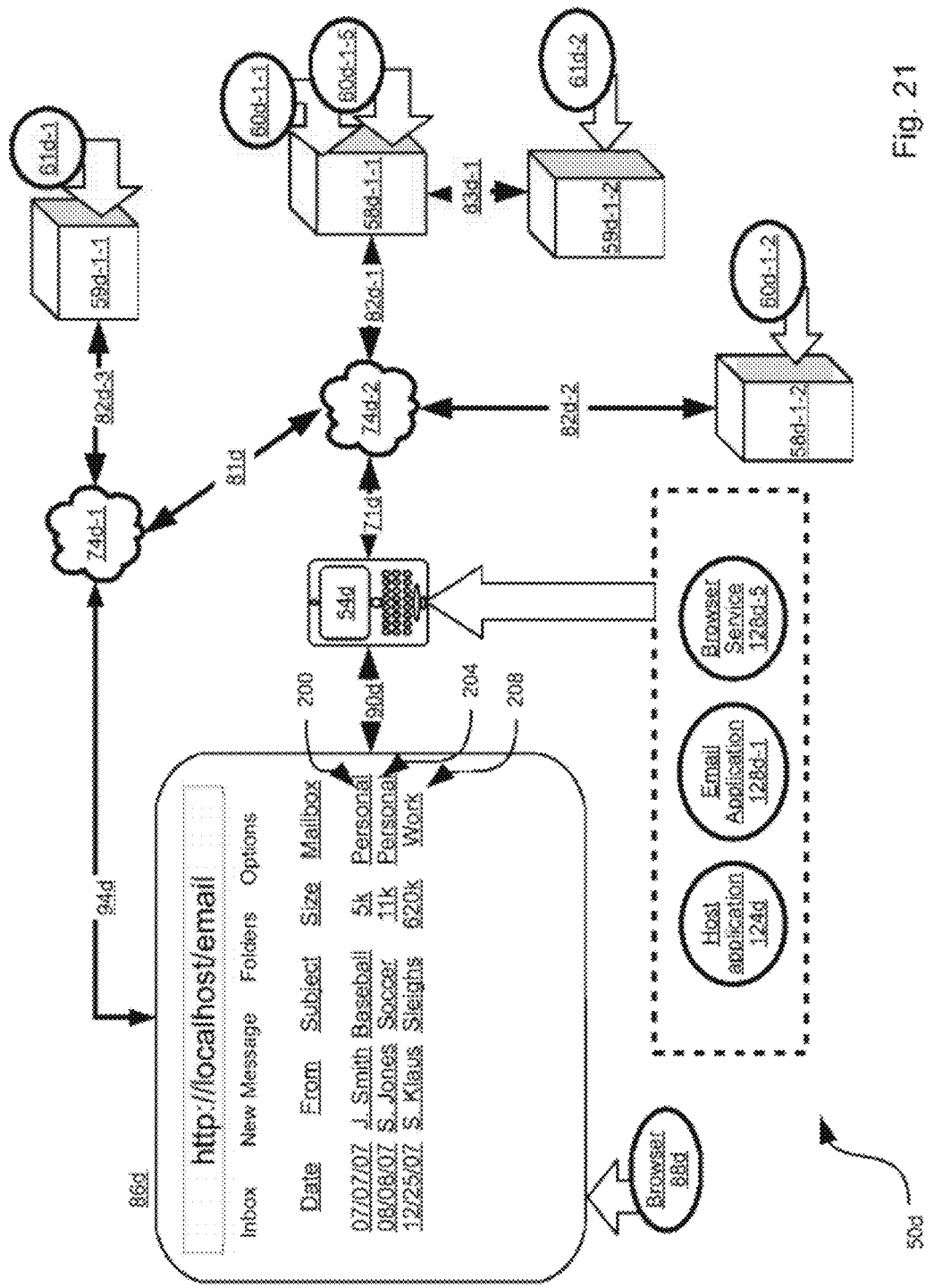
FIG. 21 shows another variation on the system of FIG. 12.

Other pathway selections are contemplated, depending on security policies and topologies. For example, FIG. 21 shows a further example topology referenced as system 50d. System 50d is a variant of system 50c, so like components bear like references except followed by the suffix "d". In system 50d, link 79c is omitted and link 81d is provided. In system 50d browser service 128d-5 is configured to offer a public browsing service such that content on network 74d-1 may be browsed on client machine 86c via network 74d and browser service 128d-5, Such a pathway would thus comprise link 90d, device 54d, link 71d, network 74d-2, link 81d, server 59d-1-1.

Figure 22:
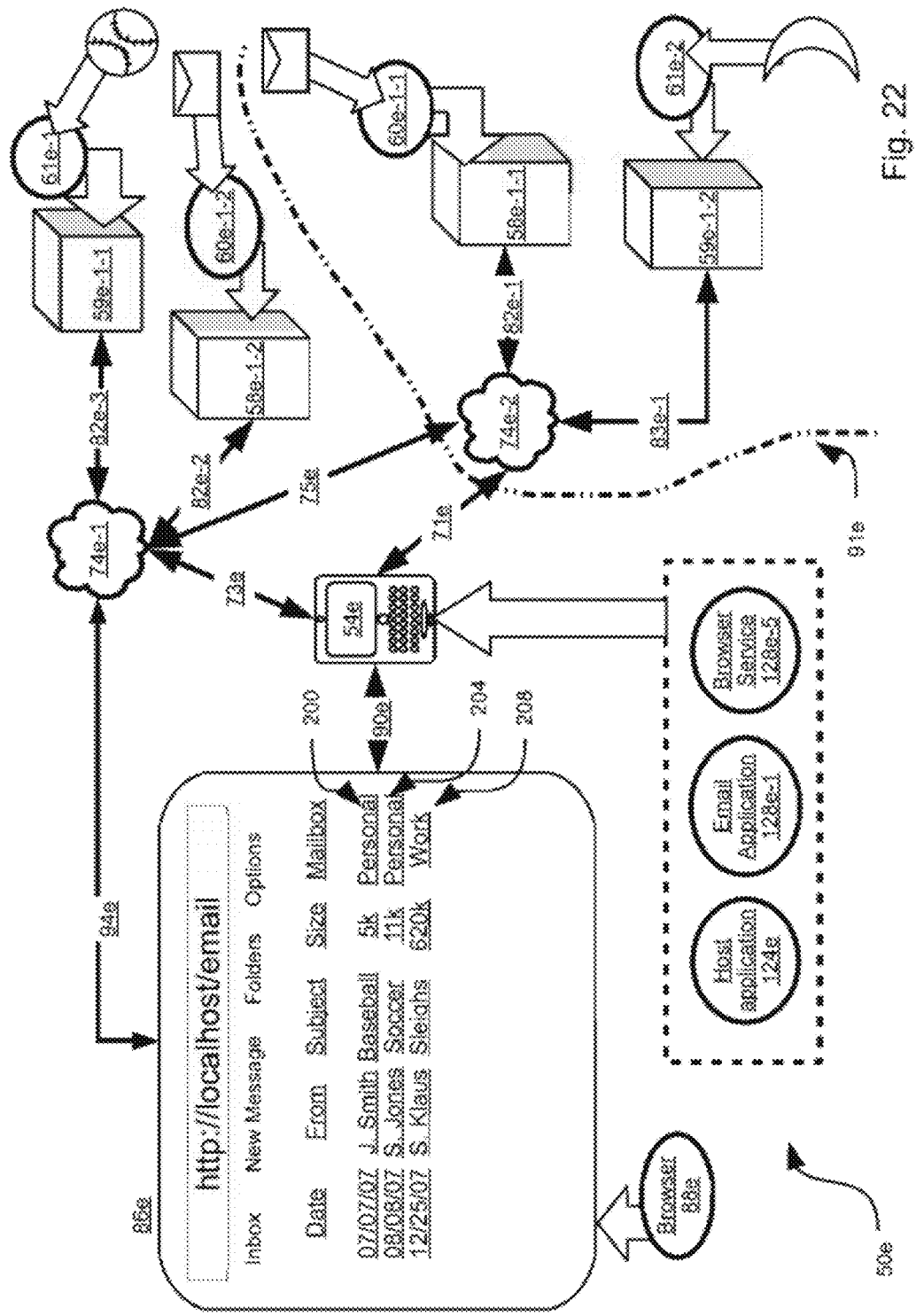
FIG. 22 shows another variation on the system of FIG. 12.

As a still further example topology is shown in FIG. 22, to further emphasize the point that multiple pathways are contemplated. FIG. 22 shows system 50e, which further varies system 50d, and so again like elements bear like references except followed by the suffix "e". System 50e does have certain variations from system 50d. Of note, in system 50e, an email server 58e-1-1 and a corporate web server 59e-1-2 connect to a corporate private network 74-e2, all of which is situated behind a corporate firewall 91e. Device 54e is provisioned for secure access to corporate network 74e via link 71e. Also in system 50e, network 74e-1 comprises the public Internet, which is directly connectable to device 54e via link 73e, and is also connected, via link 75e, to corporate private network 74e-2, although behind firewall 91e. Also in system 50e, public email server 58e-1-2 is connected to public Internet network 74e-1. At least the following pathways are therefore available in system 50e:

A) a public content direct pathway between client machine 86e and server 59e-1-1, comprising link 94e, network 74e-1, and link 62e-3.

B) A public content corporate indirect pathway between client machine 86e and server 59e-1-1, comprising link 90e, link 71e, link 75e, and link 82e-3.

C) A public content indirect pathway between client machine 86e and server 59e-1-1, comprising link 90e, link 73e, and link 82e-3.

D) A private content corporate pathway between client machine 83 and server 59e-1-2, comprising link 90e, link 71e, and link 83e-1.

E) A private content direct pathway between client machine 86e and server 59e-1-2, comprising link 94e, link 75e and link 83e-1.

In a still further variation, not shown, link 94e may be implemented as a core mobile network link, like link 70. Alternatively, an additional link between client machine 86e and network 74e-1 may be provided. Where such a core mobile network link is offered between client machine 86e and network 74e, then the selection of a content pathway can be based on which link offers advantageous bandwidth, speed, security, or the like.

Note that additional links can be added in system 50e, or various links can be removed to provide still further variations of topologies and pathways.

Other variations, combinations, and subsets of the foregoing will now occur to those skilled in the art. For example, a tablet computer can also be used in system 50 as client machine 86. As another example, while system 50b (or its variants) is discussed in relation to email applications, it should be understood that system 50b (or its variants) may be varied to accommodate other types of applications, including messaging applications. Examples of other types of messaging applications include instant messages that embed rich content, or short message service (SMS) messages that embed rich content, or messaging applications that are embedded within social networking applications such as Facebook™ and Twitter™.

The invention claimed is:

1. An electronic device comprising:
   a processor configured to:
   receive a message via a first communication path wherein the first communication path is a secure communication path to an enterprise network via a portable electronic device;
   determine whether the message is associated with an enterprise mail account or a personal mail account;
   in response to a determination that the message is associated with the enterprise mail account:
   select the first communication path for retrieving content referenced in the message; and
   retrieve the content referenced in the message via the first communication path; and
   in response to a determination that the message is associated with the personal mail account:
   select a second communication path for retrieving the content referenced in the message, wherein the second communication path provides a communication path to a public network, the second communication path not including the portable electronic device; and
   retrieve the content referenced in the message via the second communication path.

2. The electronic device of claim 1, wherein the message comprises an electronic mail message.

3. The electronic device of claim 1, wherein the selected communication path is selected based on a server that originated the message.

4. The electronic device of claim 1, wherein the selected communication path is selected based upon a sender of the message.

5. The electronic device of claim 1, wherein the message includes a link specifying a source for the content referenced in the message.

6. The electronic device of claim 1, wherein the message includes a reference to a proxy server for retrieving the content.

7. The electronic device of claim 1, wherein the processor is configured to select a default connection.

8. The electronic device of claim 1, wherein the processor is configured to select an alternate connection when a default connection fails.

9. The electronic device of claim 1, wherein the first communication path comprises encryption.

10. A method comprising:
    receiving, by an electronic device, a message via a first communication, wherein the first communication path is a secure communication path to an enterprise network via a portable electronic device;
    determining whether the message is associated with an enterprise mail account or a personal mail account;
    in response to a determination that the message is associated with the enterprise mail account:
    selecting the first communication path for retrieving content referenced in the message; and
    retrieving the content referenced in the message via the first communication path; and
    in response to a determination that the message is associated with the personal mail account:
    selecting a second communication path for retrieving the content referenced in the message, wherein the second communication path at the electronic device provides a communication path to a public network, the second communication path not including the portable electronic device; and
    retrieving the content referenced in the message via the second communication path.

11. The method of claim 10, wherein the message comprises an electronic mail message.

12. The method of claim 10, wherein the selecting is based on a server that originated the message.

13. The method of claim 10, wherein the selecting is based on a sender of the message.

14. The method of claim 10, wherein the message includes a reference to a server providing access to the content.

15. The method of claim 10, wherein the message includes a reference to a proxy server.

16. The method of claim 10, wherein the selecting comprises selecting a default connection.

17. The method of claim 10, wherein the selecting comprises selecting an alternate connection when a default connection fails.

18. A method comprising:
    receiving, by an electronic device, a message via a first communication path, wherein the first communication path provides a secure communication path to an enterprise network via a portable electronic device and the portable electronic device is included in a third communication path to the enterprise network;
    determining whether a server hosting the message is associated with a work messaging account on the enterprise network or a personal messaging account;
    in response to a determination that the server is associated with the work messaging account:
    selecting the first communication path for retrieving content referenced in the message; and
    retrieving the content referenced in the message via the first communication path from a server different than the server hosting the message; and
    in response to a determination that the server is associated with the personal messaging account:
    selecting a second communication path for retrieving the content referenced in the message, wherein the second communication path at the electronic device provides a communication path to a public network, the second communication path not including the portable electronic device; and retrieving the content referenced in the message via the second communication path from a server different than the server hosting the message.

19. The method of claim 18, wherein the content referenced in the message is an attachment of the message.

* * * * *